(12) United States Patent  (10) Patent No.: US 9,378,422 B2
Saruta  (45) Date of Patent: Jun. 28, 2016

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Takayuki Saruta, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/520,841

(22) Filed: Oct. 22, 2014

(65) Prior Publication Data

US 2015/0109474 A1  Apr. 23, 2015

(30) Foreign Application Priority Data

Oct. 23, 2013 (JP) ................................. 2013-220439

(51) Int. Cl.
*G06K 9/34* (2006.01)
*G06K 9/00* (2006.01)

(52) U.S. Cl.
CPC ........ *G06K 9/00664* (2013.01); *G06K 2209/27* (2013.01)

(58) Field of Classification Search
CPC .............. G06T 7/0081; G06T 2207/20144; G06T 7/0083; G06T 2207/10016; G06K 9/38; G03B 15/02; G03B 15/05; G03B 15/06; G03B 15/03; F21W 2131/406; H04N 19/197
See application file for complete search history.

(56) References Cited

U.S. PATENT DOCUMENTS 7,860,320 B2  12/2010  Luo

FOREIGN PATENT DOCUMENTS

JP  2011-253354 A  12/2011
JP  2012-004716 A  5/2012

OTHER PUBLICATIONS

R. Socher, "Parsing Natural Scenes and Natural Language with Recursive Neural Networks", International Conference on Machine Learning 2011.
P. Krahenbuhl, "Efficient Inference in Fully Connected CRFs with Gaussian Edge Potentials", Neural Information Processing Systems 2011.
P. Felzenszwalb, "Efficient Graph-Based Image Segmentation", International Journal of Computer Vision 2004.3.
P. Felzenszwalb, "A Discriminatively Trained, Multiscale, Deformable Part Model", Computer Vision and Pattern Recognition 2008.

*Primary Examiner* — Duy M Dang
(74) *Attorney, Agent, or Firm* — Canon USA, Inc., IP Division

(57) ABSTRACT

In order to precisely identify a class relating to classification of an object at each of regions of an image, an image processing apparatus includes an acquisition unit configured to acquire image capturing information when the object has been captured, an estimation unit configured to estimate distribution relating to a degree of existence of each class which indicates classification of the object at each of predetermined regions of a captured image of the object based on the image capturing information acquired by the acquisition unit, and an identification unit configured to identify the class at each of the regions based on distribution information indicating the distribution estimated by the estimation unit and image information relating to the captured image.

15 Claims, 26 Drawing Sheets

FIG. 2A
FIG. 2B
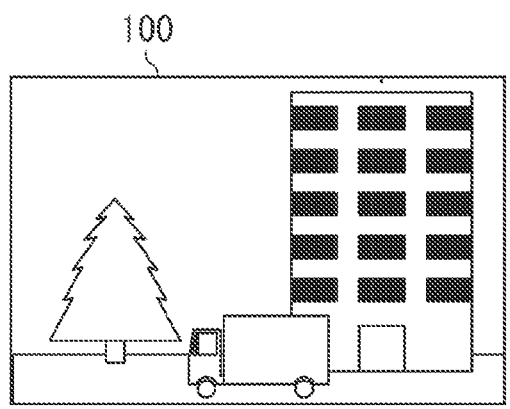
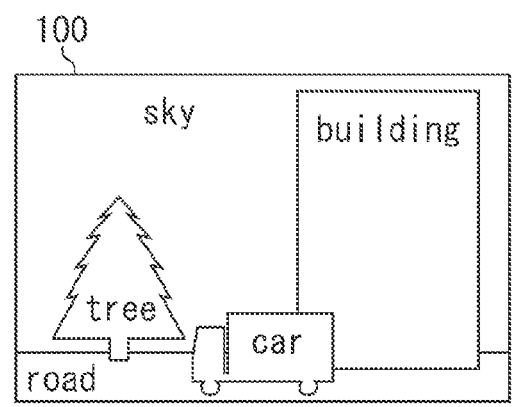

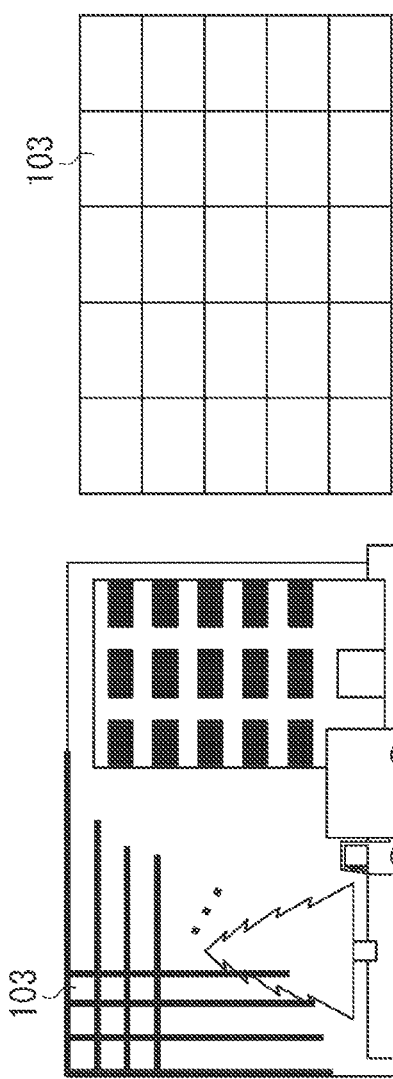

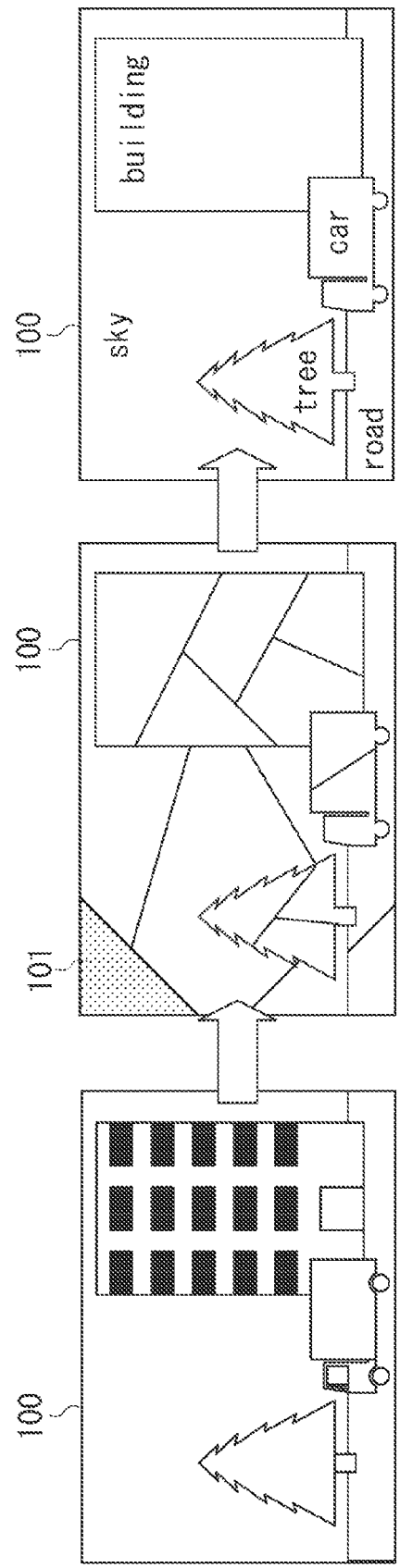

IMAGE PROCESSING APPARATUS, IMAGE PROCESSING METHOD, AND STORAGE MEDIUM

BACKGROUND OF THE INVENTION

1. Field of the Invention

The present invention relates to an image processing apparatus, an image processing method, and a storage medium.

2. Description of the Related Art

As one of image recognition methods, there is provided a method in which a class relating to classification of an object is identified in each of segmented regions by segmenting a captured image into a plurality of regions. In this method, a class of each region is identified based on a feature quantity extracted from the region. By properly segmenting the image into regions, various kinds of image processing such as recognition of an object or a scene and correction of image quality according to the object can be easily executed.

According to a technique discussed in R. Socher, "Parsing Natural Scenes and Natural Language with Recursive Neural Networks", International Conference on Machine Learning 2011, an input image is segmented into small regions known as super pixels based on color information and texture information. In the technique, classes of the segmented small regions are identified by using classifiers known as recursive neural networks (RNNs).

According to a technique discussed in P. Krahenbuhl, "Efficient Inference in Fully Connected CRFs with Gaussian Edge Potentials", Neural Information Processing Systems 2011, region segmentation and class identification are simultaneously executed by using a conditional random field (CRF). In the technique, the class of each pixel is not only identified based on the features extracted from the pixels, but also identified by taking co-occurrence of classes in adjacent pixels into consideration. In the technique, with respect to a pixel having unspecific features which is difficult to be recognized independently, identification thereof is executed by taking a relationship between that pixel and pixels in its neighbor into consideration. More specifically, in the technique, a summation of pixels in an entire image is minimized by taking each of the pixels as a node to define energy of the node (unary potential) and energy between the nodes (pairwise potential). Then, in the technique, a class of each pixel for minimizing the energy is identified.

In the above-described two techniques, information used for region segmentation and class identification is acquired from an image (feature quantity). However, there is provided another technique in which the region segmentation is executed by using information other than image that can be acquired at the time of capturing the image in addition to using the information that can be acquired from the image.

According to a technique discussed in U.S. Pat. No. 7,860, 320, an estimation score for a class of an object of a region (super pixel (SP)) in an image is changed according to an area by using positional information through a global positioning system (GPS). For example, if the area thereof is an equatorial area, the positional information may be indicated as "NO SNOW". Further, in the technique, time and direction the image has been captured are also used as the information, and a co-occurrence table of a spatial arrangement relationship between the classes of the object is changed according to the positional information.

According to a technique discussed in Japanese Patent Application Laid-Open No. 2012-4716, object distance information is acquired when an image is captured, so that the image is segmented into regions based on the object distance information. In the technique, scene determination is executed at each segmented region, so that image processing is executed at each segmented region based on a determination result thereof.

In a technique discussed in Japanese Patent Application Laid-Open No. 2011-253354, an image is segmented into a foreground region and a background region based on an optional object extraction result acquired from image segmentation and distance information that can be acquired when the image is captured. In this technique, for example, the image is segmented by taking a pixel with a distance shorter than a distance of a predetermined object as a foreground region while taking a pixel other than that pixel as a background region.

In the above-described conventional techniques, a class of each region in the image is identified by using a previously-trained classifier by taking a feature quantity extracted from the region as an input. However, with the above-described techniques, the class of each region cannot be precisely identified.

SUMMARY OF THE INVENTION

An image processing apparatus according to the present invention includes an acquisition unit configured to acquire image capturing information when an object has been captured, an estimation unit configured to estimate distribution relating to a degree of existence of each class which indicates classification of the object at each of predetermined regions of a captured image of the object based on the image capturing information acquired by the acquisition unit, and an identification unit configured to identify the class at each of the regions based on distribution information indicating the distribution estimated by the estimation unit and image information relating to the captured image.

According to an aspect of the present invention, a class relating to classification of an object can be precisely identified at each region of an image.

Further features of the present invention will become apparent from the following description of exemplary embodiments with reference to the attached drawings.

BRIEF DESCRIPTION OF THE DRAWINGS

FIGS. 2A and 2B are diagrams illustrating a first example of an identification target image.

FIGS. 3A and 3B are diagrams illustrating a second example of the identification target image.

FIGS. 11A, 11B, and 11C are diagrams illustrating a fifth example of the identification target image.

DESCRIPTION OF THE EMBODIMENTS

Various exemplary embodiments, features, and aspects of the invention will be described in detail below with reference to the drawings.

Figure 1:
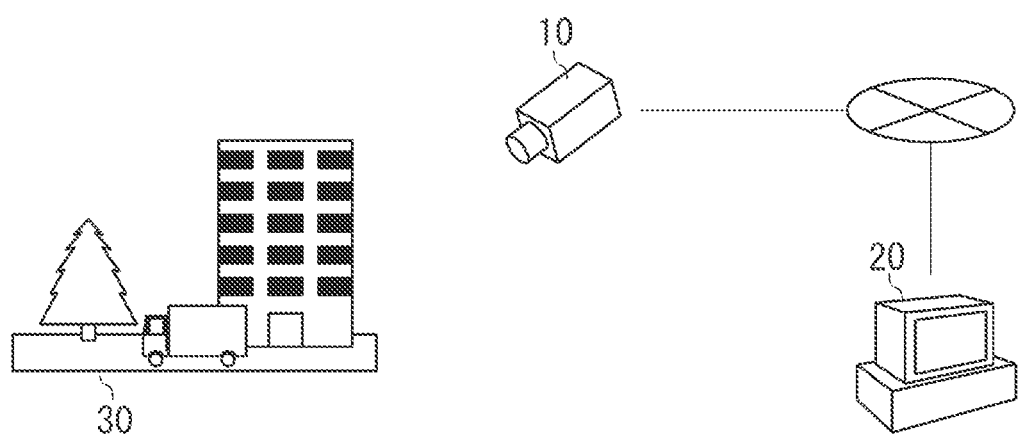
FIG. 1 is a diagram illustrating an example of a system configuration.

FIG. 1 is a diagram illustrating an example of a system configuration.

In the system configuration illustrated in FIG. 1, a camera 10 and an image recognition apparatus (image processing apparatus) 20 are connected to each other via a network. The image recognition apparatus 20 and the camera 10 may be configured integrally.

The camera 10 captures a scene 30 serving as a target of image processing executed by the image recognition apparatus 20. The image recognition apparatus 20 identifies a class of each region of the scene 30 photographed (captured) by the camera 10. Specifically, the image recognition apparatus 20 executes region segmentation and class identification of an identification target image (captured image) based on the identification target image photographed by the camera 10 (image capturing unit) and image capturing information that is acquired when the identification target image is captured by the camera 10. This class represents a name of a class category relating to classification of the object. The class will be described below in detail with reference to FIGS. 2A and 2B. Further, the image capturing information is information other than an image that is acquired when the image is captured by the camera 10, which represents entire information acquired by the camera 10 until the image is output therefrom. For example, the image capturing information may be distance information acquired at the time of adjusting a focus, information relating to a color temperature or a photometric value with which a camera parameter for capturing the image such as a shutter speed is determined, and information such as the camera parameter determined thereby. Furthermore, the image capturing information may be information of captured date and time, GPS information, or information relating to top-and-bottom determination determined by an orientation sensor disposed within the camera 10.

FIGS. 2A and 2B are diagrams illustrating an example of an identification target image.

In a first exemplary embodiment, processing for identifying a class of each pixel of an identification target image 100 captured as illustrated in FIG. 2A will be described as an example.

The term "class" used herein represents a name of a class category relating to classification of an object such as "sky", "tree", or "car", allocated to each of the corresponding pixels as illustrated in FIG. 2B.

FIGS. 3A and 3B are diagrams illustrating an example of concept relating to identification of the pixels in the identification target image.

The region segmentation is realized by allocating the class to each of pixels 103. FIG. 3B is an enlarged view of an upper left portion of FIG. 3A, illustrating a state where each of the pixels 103 is allocated to a sky category.

Figure 4:
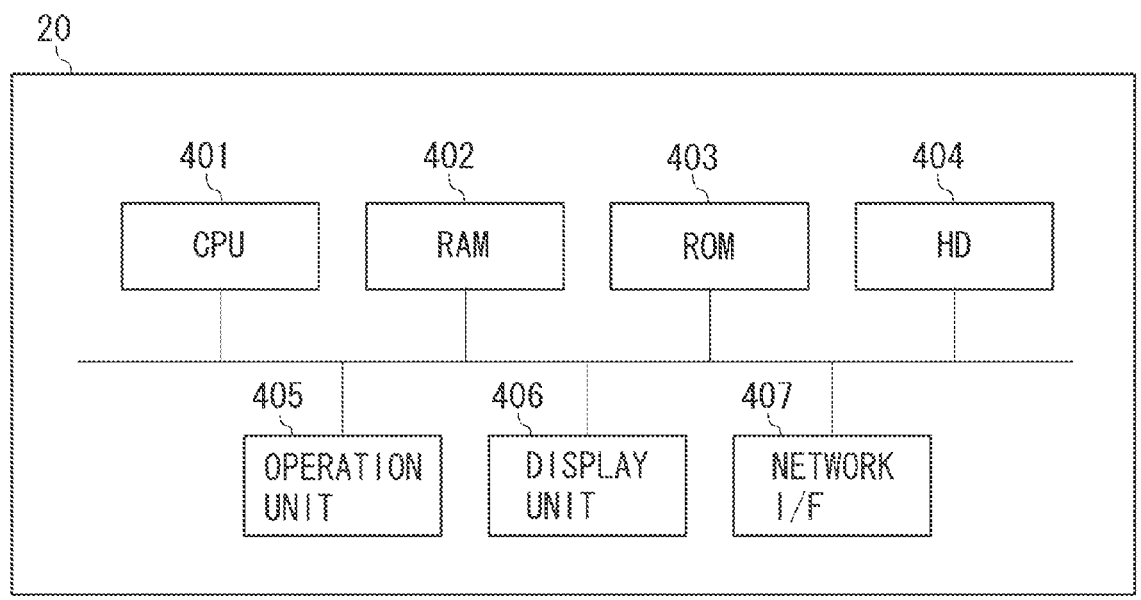
FIG. 4 is a diagram illustrating an example of a hardware configuration of an image recognition apparatus.

FIG. 4 is a diagram illustrating an example of a hardware configuration of the image recognition apparatus 20.

A central processing unit (CPU) 401 controls an entire portion of the image recognition apparatus 20. The CPU 401 executes a program stored in a read only memory (ROM) 403 or a hard disk (HD) 404, so as to realize a functional configuration of the image recognition apparatus 20 and processing of the flowchart relating to the image recognition apparatus 20 described below.

A random access memory (RAM) 402 is a storage region functioning as a work area where the CPU 401 loads and executes the program.

The ROM 403 is a storage region for storing the program executed by the CPU 401.

The HD 404 is a storage region for storing various kinds of data such as various programs necessary for the CPU 401 to execute the processing and data relating to a threshold value.

An operation unit 405 receives an input operation executed by a user.

A display unit 406 displays information of the image recognition apparatus 20.

A network interface (I/F) 407 connects the image recognition apparatus 20 to external devices.

Figure 5:
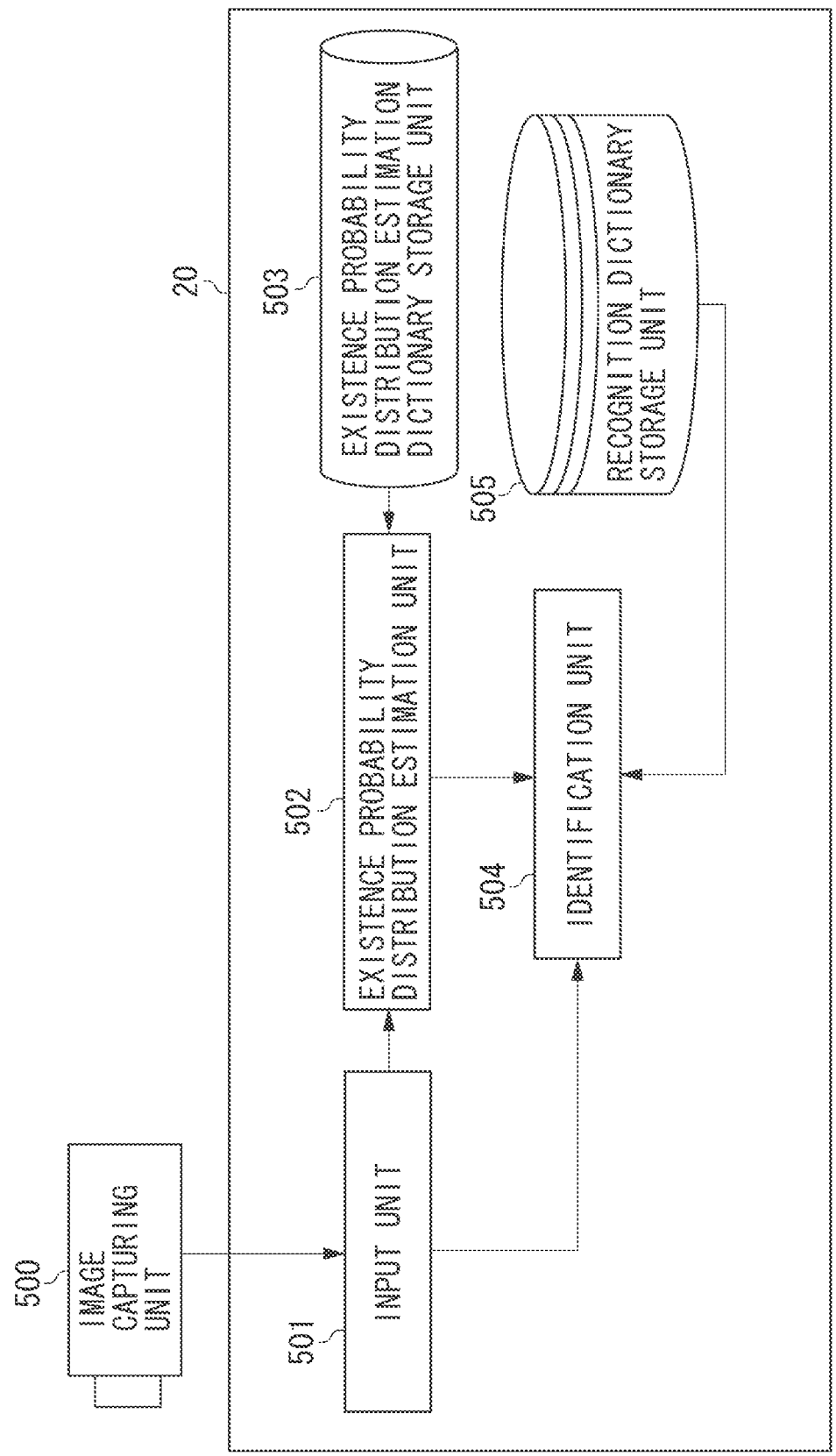
FIG. 5 is a diagram illustrating an example of a functional configuration of an image recognition apparatus according to a first exemplary embodiment.

FIG. 5 is a diagram illustrating an example of a functional configuration of the image recognition apparatus 20 according to the present exemplary embodiment.

An image capturing unit 500 corresponds to the camera 10, and acquires an identification target image.

The image recognition apparatus 20 according to the present exemplary embodiment includes an input unit 501, an existence probability distribution estimation unit 502, and an identification unit 504. Further, the image recognition apparatus 20 includes an existence probability distribution estimation dictionary storage unit 503 and a recognition dictionary storage unit 505 as storage units. The existence probability distribution estimation dictionary storage unit 503 and the recognition dictionary storage unit 505 may be configured as non-volatile storage devices connected to the image recognition apparatus 20. The above-described various functions included in the image recognition apparatus 20 will be described below in detail with reference to FIG. 6.

Figure 6:
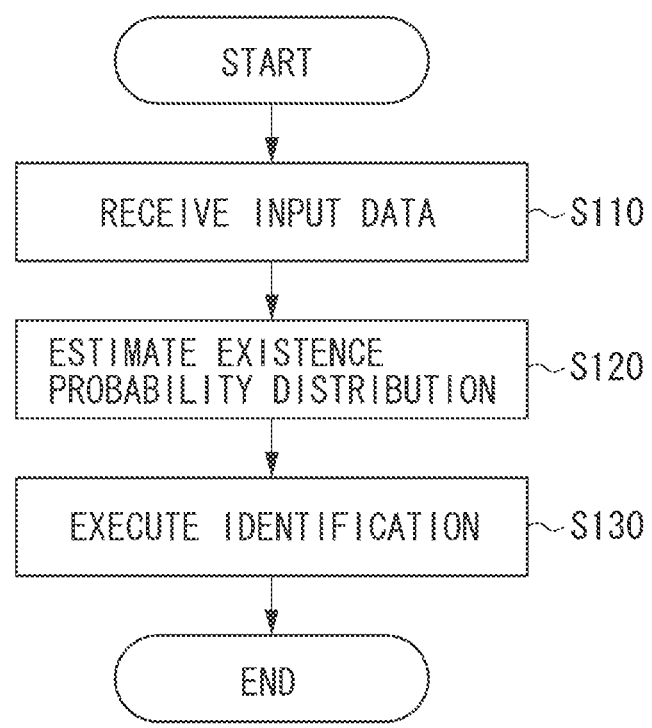
FIG. 6 is a flowchart illustrating a first example of processing according to the first exemplary embodiment.

FIG. 6 is a flowchart illustrating an example of processing according to the present exemplary embodiment.

In step S110, the input unit 501 receives an identification target image captured by the image capturing unit 500 and image capturing information acquired at the time of capturing the image as input data.

In step S120, based on the image capturing information received in step S110, the existence probability distribution estimation unit 502 estimates existence probability distribution of the class at each of predetermined positions of the identification target image by using a dictionary (training information) stored in the existence probability distribution estimation dictionary storage unit 503. The existence probability distribution is an example of distribution information relating to distribution of a degree of existence of each class. The existence probability distribution estimation unit 502 transmits information relating to the estimated existence probability distribution (hereinafter, simply referred to as "existence probability distribution") to the identification unit 504. The dictionary will be described below in detail with reference to FIG. 8.

In step S130, the identification unit 504 identifies a class of each pixel of the identification target image received in step S110. The identification unit 504 executes identification by using a classifier stored in the recognition dictionary storage unit 505 and the existence probability distribution estimated in step S120.

Subsequently, each step of processing will be described specifically with reference to the flowchart illustrated in FIG. 6.

In step S110, the input unit 501 acquires the identification target image in which the target scene 30 illustrated in FIG. 1 is captured, and the image capturing information acquired at the time of capturing the image from the image capturing unit 500. The identification target image and the image capturing information may be acquired and stored in an external device in advance. In such a case, the input unit 501 acquires the identification target image and the image capturing information from the external device.

The image capturing information will be described in detail. In the present exemplary embodiment, the image capturing information is denoted as "$Ph_k$", whereas "$k$" is an index for indicating the image capturing information. The distance information that can be acquired when the image capturing unit 500 adjusts the focus will be described as an example of the image capturing information.

Figure 7A:
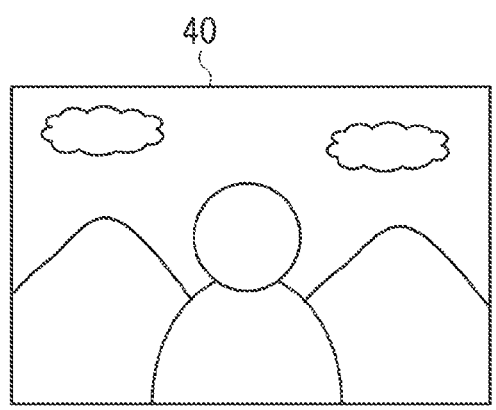
FIGS. 7A and 7B are diagrams illustrating a third example of the identification target image.
Figure 7B:
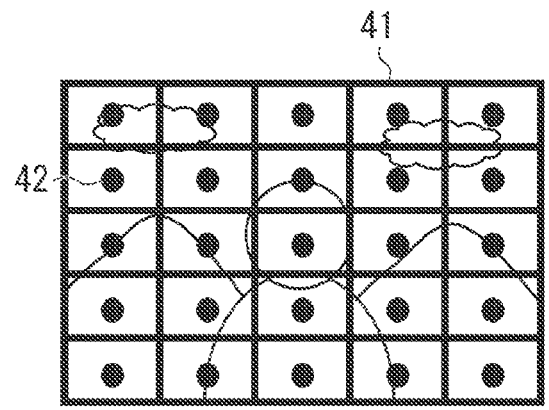

FIGS. 7A and 7B are diagrams illustrating an example of a range-finding point 42 for acquiring an object distance with respect to an identification target image 40.

The range-finding point 42 serves as a central point of each segmented region in a range-finding frame 41. Because the distance information cannot be acquired at a region other than the central point within the same segmented region, a value of the distance at a region other than the central point is assumed to be the same as that in the central point. Alternatively, a value interpolated by an interpolation method such as a linier interpolation may be applied to the value of the distance at the region other than the central point. As described above, the object distance corresponding to the position of each of the pixels of the identification target image 40 can be acquired thereby. Herein, an object distance corresponding to the position of each pixel is denoted as $Ph_1(x, y)$. Similarly, the image capturing unit 500 calculates the other image capturing information $Ph_k(x, y)$. Further, with respect to the information such as a color temperature or a photometric value which is uniquely determined in association with a scene, the image capturing unit 500 sets the same value for all of the pixel positions. In the present exemplary embodiment, description has been given to the distance information that can be acquired when the image capturing unit 500 adjusts the focus. However, the distance information may be acquired at the time of capturing the image by attaching a range-finding sensor thereto besides an image capturing sensor.

Description will be given by returning to FIG. 6.

In step S120, based on the image capturing information $Ph_k(x, y)$ received in step S110, the existence probability distribution estimation unit 502 estimates the existence probability distribution of the class at each of the predetermined positions of the identification target image. In the present exemplary embodiment, the existence probability distribution of the class corresponding to the position of the pixel is denoted as $P_c(x, y)$. Herein, "$c$" is an index for indicating the class category.

In the present exemplary embodiment, a setting function $g_c$ which takes the image capturing information as an input as shown in formula 1 while taking the existence probability distribution of each class as an output is trained at each class and stored in a storage region in advance. A training method of the setting function $g_c$ will be described below. Further, in the present exemplary embodiment, description will be given to an example of using one setting function which takes the image capturing information as an input. However, the setting function may be stored in the storage region at respective pieces of image capturing information such as GPS information and information of captured date and time. Then, the existence probability distribution estimation unit 502 may estimate the existence probability distribution by selecting the setting function corresponding to the image capturing information.

The existence probability distribution $P_c(x, y)$ of the class corresponding to the position of each pixel is estimated by the following formula 1.

$$P_c(x,y)=g_c(Ph_1(x,y),Ph_2(x,y),\ldots,Ph_k(x,y)) \quad \text{Formula 1}$$

Further, information such as a luminance value or a feature quantity that can be acquired from each pixel of the identification target image may be denoted as $I(x, y)$, so that the information that can be acquired from the identification target image can be added thereto as expressed by the following formula 2.

$$P_c(x,y)=g_c(Ph_1(x,y),Ph_2(x,y),\ldots,Ph_k(x,y),I(x,y)) \quad \text{Formula 2}$$

Furthermore, the image capturing information used in the present exemplary embodiment may be a difference of given pieces of image capturing information acquired by the following formula 3.

$$Ph_t(x,y)=Ph_{t1}(x+\alpha,y+\beta)-Ph_{t1}(x,y) \quad \text{Formula 3}$$

In the formula 3, "$\alpha$" and "$\beta$" are predetermined constant numbers. With the formula 3, similarity in the image capturing information of the pixels separated from each other by a distance defined by "$\alpha$" and "$\beta$" can be calculated. For example, a certain constant number Y may be defined as expressed by the following formula 4.

$$Ph_t(x,y)=Ph_{t1}(x,Y)-Ph_{t1}(x,y) \quad \text{Formula 4}$$

For example, when the image capturing information is the distance information while the constant number Y is 0 (Y=0), the image capturing information is a difference in distance between a position of Y=0 and a position at an upper portion of the image. Therefore, in a case where the class category of the pixel at the upper portion of the image is a sky category, the possibility of acquiring a small value for the difference in distance becomes high in comparison to the case where the class category thereof is not the sky category, when the pixel the image recognition apparatus 20 is referring to is the sky category. On the other hand, in a case where the class category of the pixel at the upper portion of the image is not the sky category, the possibility of acquiring a large value for the difference in distance becomes high in comparison to the case where the class category thereof is the sky category. Therefore, the image recognition apparatus 20 can estimate whether the class categories are the same according to the difference in distance values thereof.

The image recognition apparatus 20 can estimate the existence probability of the category on which a plurality of kinds of image capturing information is reflected by calculating the existence probability distribution by using the setting function $g_c$. For example, existence probability of the sky category will be high for the pixel having respective values of a color temperature, a photometric value, and an object distance greater than those of other pixels. Further, a region that is darker than other region is more likely to be a backlight region, and thus that region is more likely to be categorized as a main object such as a human body rather than the sky.

In step S130, the identification unit 504 identifies a class of the pixel of the identification target image received in step S110. The identification unit 504 identifies the class of each pixel by using the existence probability distribution estimated in step S120 and the classifier stored in the recognition dictionary storage unit 505. The classifier is trained by using the image information. A training method thereof and the image information will be described below more specifically.

In the present exemplary embodiment, a classifier that takes the image information as an input while taking posterior probability of each class as an output expressed by the following formula 5 will be employed. Herein, the image information corresponding to the position of each pixel, such as a feature quantity is denoted as $F(I, x, y)$, and posterior probability is denoted as $P_{c|F=F(I, x, y)}$. "I" represents an identification target image. Further, if a function (classifier) that takes the image information as an input and likelihood as an output is denoted as $L_c(F(I, x, y))$, the posterior probability of each class is expressed by the following formula 5.

$$P_{c|F=F(I,x,y)}(x,y) = L_c(F(I,x,y)) \cdot P_c(x,y) \quad \text{Formula 5}$$

The identification unit 504 calculates the posterior probability of each pixel from the likelihood acquired by the classifier and the existence probability distribution, and allocates a class of the highest posterior probability of the pixel as expressed by the following formula 6, so as to realize the region segmentation and the class identification.

$$\hat{c}(x, y) = \underset{c \in S_c}{\arg\max} P_{c|F=F(I,x,y)}(x, y) \quad \text{Formula 6}$$

In the formula 6, "Sc" represents a set of the classes, and the number of classes is denoted as "N". The identification unit 504 executes the same processing with respect to the entire pixels of the identification target image.

Now, a training flow of a dictionary that is used in the present exemplary embodiment will be described.

Figure 8:
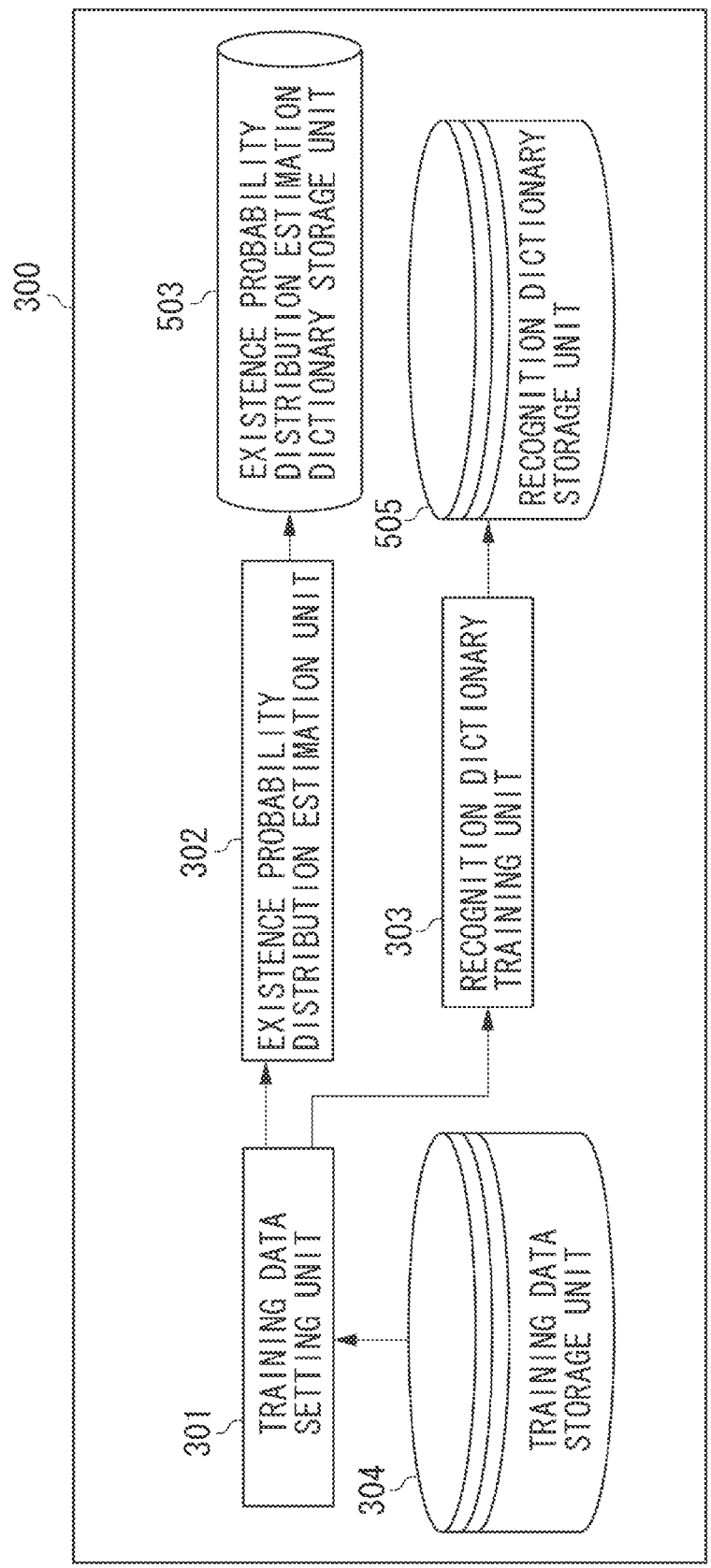
FIG. 8 is a diagram illustrating an example of a functional configuration of a training device according to the first exemplary embodiment.

FIG. 8 is a diagram illustrating an example of a functional configuration of a training device 300 according to the present exemplary embodiment. In addition, the hardware configuration of the training device 300 is the same as that illustrated in FIG. 4. Herein, the training device 300 is configured separately from the image recognition apparatus 20 of FIG. 5.

However, the training device 300 may be configured within the image recognition apparatus 20. In other words, the CPU 401 may execute the program stored in the ROM 403 or the HD 404, so as to realize a functional configuration of the training device 300 and processing of a flowchart relating to the training device 300.

The training device 300 includes a training data setting unit 301, an existence probability distribution estimation unit 302, and a recognition dictionary training unit 303. Further, the training device 300 includes a training data storage unit 304, an existence probability distribution estimation dictionary storage unit 503, and a recognition dictionary storage unit 505, each of which serves as a storage unit. The above-described various functions included in the training device 300 will be described below in detail with reference to FIG. 9.

Figure 9:
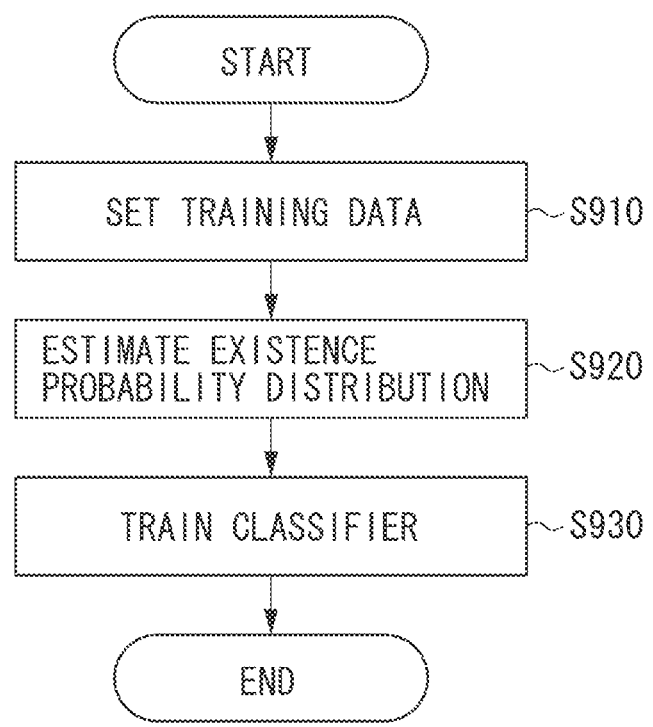
FIG. 9 is a flowchart illustrating a second example of the processing according to the first exemplary embodiment.

FIG. 9 is a flowchart illustrating an example of processing relating to training processing according to the present exemplary embodiment.

Figure 10B:
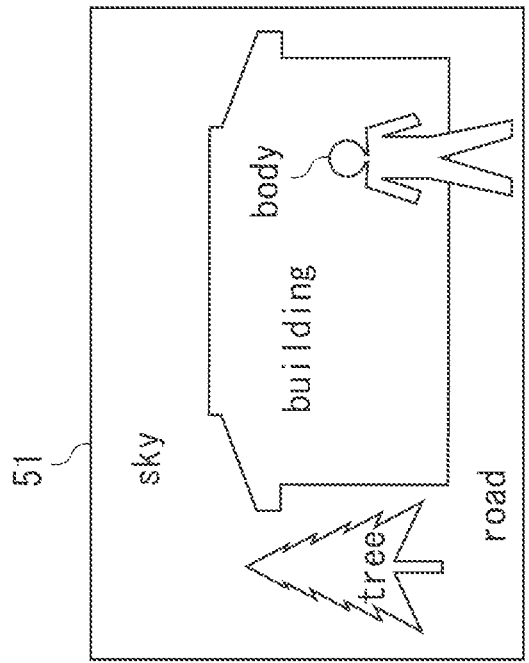
FIGS. 10A and 10B are diagrams illustrating a fourth example of the identification target image.
Figure 10A:
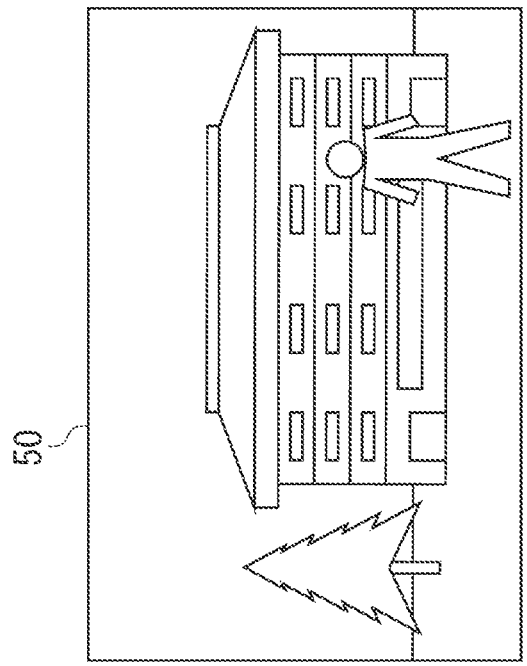

In step S910, the training data setting unit 301 sets training data used for training. In the present exemplary embodiment, as illustrated in FIGS. 10A and 10B, an image 50 and a ground truth 51 in which a class name of each pixel is defined are provided as the training data. Further, camera information of each pixel of the training data is also necessary. In step S910, the training data setting unit 301 sets the data used for the training from among the training data stored in the training data storage unit 304.

In step S920, the existence probability distribution estimation unit 302 trains the setting function $g_c$ for estimating the existence probability distribution by using the training data set in step S910. The existence probability distribution estimation unit 302 can acquire the setting function $g_c$ through regression training. Various methods such as a support vector regression (SVR) and a regression tree are provided as the regression training methods, and any of these methods can be employed therefor. Further, the existence probability distribution estimation unit 302 may provide the setting function $g_c$ as a table.

In the setting function $g_c$ trained by the regression training, as expressed by the formula 1, camera information is taken as the input information whereas the existence probability distribution of the class input thereto is taken as the output information. In the training according to the present exemplary embodiment, the existence probability distribution $P_c(x, y)$ serving as a class category is simply estimated with respect to the image capturing information $Ph_k(x, y)$ of each pixel of the training data. Therefore, the training device 300 extracts the image capturing information of the pixel and the class category of that pixel from the training data.

The above processing will be described more specifically by taking the images of FIGS. 7A and 7B as examples. In a case where the distance value of each range-finding point 42 is acquired as illustrated in FIGS. 7A and 7B, the existence probability of the sky category is high when the distance value is infinity in comparison to the case where the distance value is not infinity. If the distance value thereof is smaller than that of other range-finding point 42, the existence probability of a body category is high in comparison to the case where the distance value thereof is greater than the others. If the distance value thereof has a value other than the above-described values, the existence probability of the category other than the sky category will be approximately the same. The training device 300 trains a setting function for estimating the above-described existence probability from the image capturing information.

In step S930, the recognition dictionary training unit 303 trains the classifier that takes the image information (feature quantity) as the input information to output the likelihood of the class of each pixel of the identification target image. Similar to the process in step S920, data in which class names are uniquely applied to the pixels as illustrated in FIGS. 10A and 10B is used as the training data.

A method such as a support vector machine (SVM) or randomized trees may be employed as a training method of the classifier. A color feature or a texture feature of each pixel may be employed as the image information (feature quantity) used for the classifier. For example, components of respective color spaces of RGB, HSV, Lab, and YCbCr, and filter responses of the Gabor filter and the LoG filter may be used therefor. The color feature will be 12 dimensions (i.e., 4 color spaces×3 components). Further, the dimensionality of the filter response corresponds to the number of filters of the Gabor filter and the LoG filter. When the training device 300 trains a classifier, the training device 300 trains the classifier that identifies a positive instance and a negative instance by selecting the positive instance and the negative instance from the training data at each class.

As described above, according to the first exemplary embodiment, the image recognition apparatus 20 can precisely identify the class of each region of the identification target image by estimating the existence probability distribution of the class based on the image capturing information. With such processing, the precision of the region segmentation executed by the image recognition apparatus 20 can be improved.

Different from the first exemplary embodiment, the image recognition apparatus 20 according to a second exemplary embodiment executes the above identification of the class at each of segmented small regions by previously segmenting the identification target image into small regions, instead of executing the identification of the class at each pixel. The image recognition apparatus 20 can prevent regional false recognition of the class category by executing the identification after segmenting the identification target image into small regions. Therefore, the image recognition apparatus 20 estimates image capturing information or the existence probability distribution of the class estimated by using the image capturing information at each of the small regions. For example, in a case where the distance information is acquired from the image capturing information, the image recognition apparatus 20 can recognize variation in distance at each of the small regions, and then can recognize a wide range of variation. More specifically, as illustrated in FIGS. 11A to 11C, the image recognition apparatus 20 identifies the class of a small region 101 of a captured identification target image 100. FIGS. 11A to 11C are diagrams illustrating an example of the identification target image. Herein, the small region represents a region configured of one or more pixels in the image having equal to or less than a predetermined pixel value. A generation method (segmentation method) of the small region will be described below with reference to FIG. 13.

Figure 12:
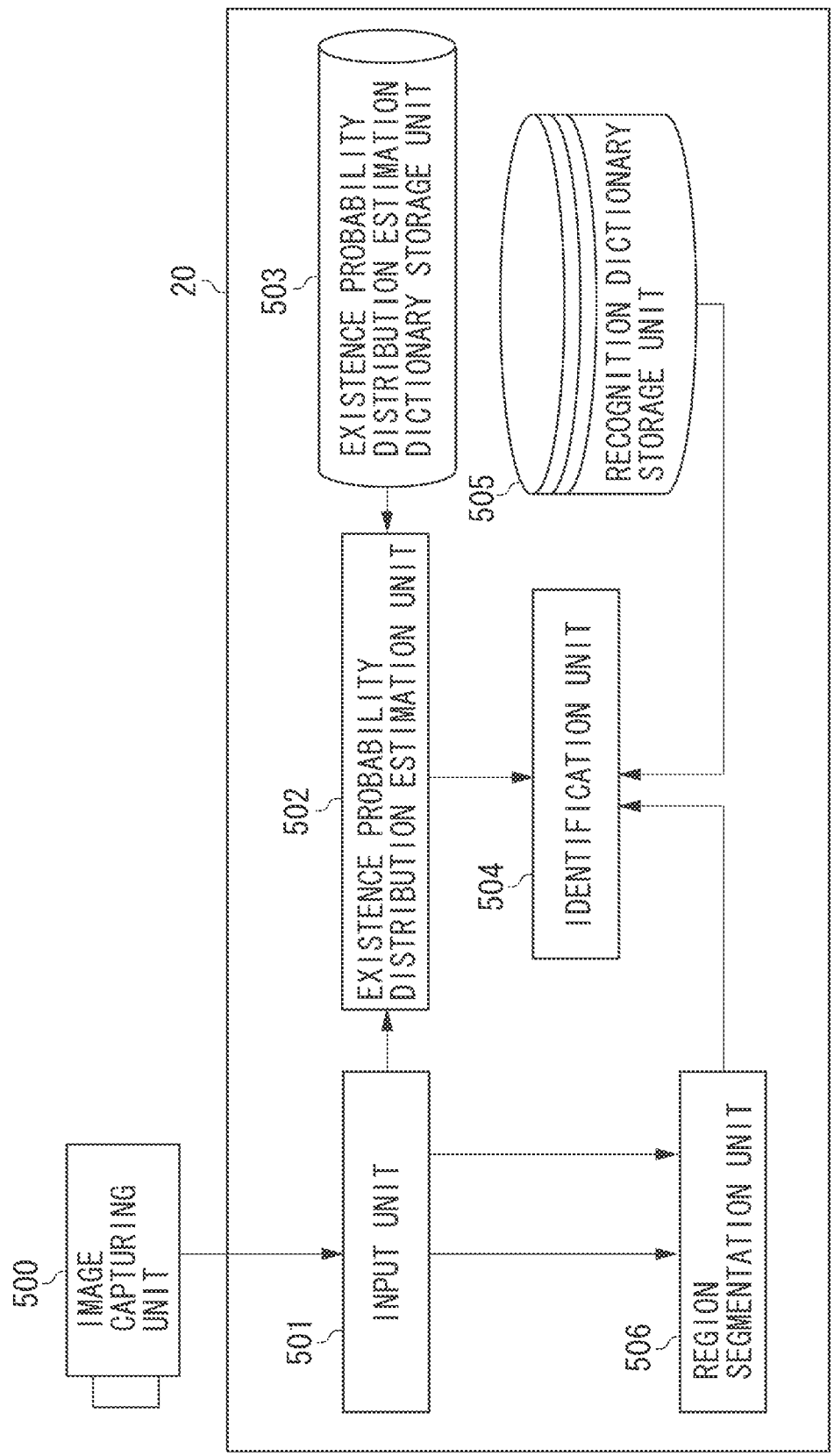
FIG. 12 is a diagram illustrating an example of a functional configuration of an image recognition apparatus according to a second exemplary embodiment.

FIG. 12 is a diagram illustrating an example of a functional configuration of the image recognition apparatus 20 according to the present exemplary embodiment. The image recognition apparatus 20 according to the present exemplary embodiment includes a region segmentation unit 506 in addition to the functional configuration illustrated in FIG. 5. The region segmentation unit 506 will be described below in detail with reference to FIG. 13. The rest of the configurations are the same as those illustrated in FIG. 5, and thus description thereof will be omitted.

Figure 13:
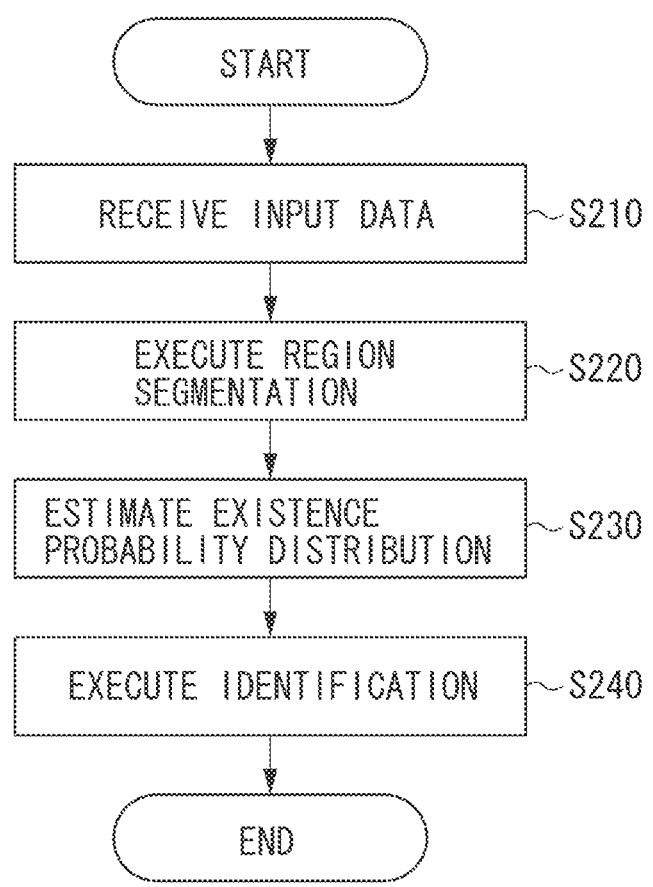
FIG. 13 is a flowchart illustrating an example of processing according to the second exemplary embodiment.

FIG. 13 is a flowchart illustrating an example of processing for segmenting the region and identifying the class of each region executed by the image recognition apparatus 20 according to the present exemplary embodiment.

The process in step S210 is the same as that described in step S110, and thus the description thereof will be omitted.

In step S220, the region segmentation unit 506 segments the identification target image received in step S110 into small regions. For example, the region segmentation unit 506 segments the identification target image into small regions known as super pixels (SP) described in P. Felzenszwalb, "Efficient Graph-Based Image Segmentation", International Journal of Computer Vision 2004.3. Then, the region segmentation unit 506 transmits a result of the region segmentation to the identification unit 504.

In step S230, the existence probability distribution estimation unit 502 executes approximately the same process as described in step S120, although the class is estimated at each of the small regions segmented in step S220. More specifically, the existence probability distribution estimation unit 502 calculates the existence probability distribution of each pixel within the region, and averages the existence probability distribution by the number of pixels within the region by the following formula 7. The existence probability distribution $P_c(x, y)$ in the formula 7 can be calculated by the formula 1 or 2 as described in the first exemplary embodiment. "R" represents a small region, whereas "$i$" is an index for indicating one small region. Further, "E" represents the average.

$$Pc(R_i) = E\left(\sum_{(x,y) \in R_i} Pc(x, y)\right) \quad \text{Formula 7}$$

Further, the existence probability distribution estimation unit 502 may average the image capturing information at each small region instead of averaging the existence probability distribution. In such a case, the existence probability distribution estimation unit 502 averages the image capturing information by the following formula 8.

$$Ph_k(R_i) = E\left(\sum_{(x,y) \in R_i} Ph_k(x, y)\right) \quad \text{Formula 8}$$

Therefore, the existence probability distribution of each class can be estimated by the following formula 9.

$$Pc(R_i) = g_c(Ph_1(R_i), Ph_2(R_i), \ldots, Ph_k(R_i)) \quad \text{Formula 9}$$

As described above, different from the first exemplary embodiment, because the existence probability distribution estimation unit 502 averages the image capturing information at each small region, the existence probability distribution estimation unit 502 can execute noise-robust estimation to obtain a wide range of variation.

In step S230, the identification unit 504 identifies a class of each of the small regions. Similar to the first exemplary embodiment, the SVM or the randomized trees may be employed as the classifier. In addition, the feature quantity used for the classifier is extracted from each region. For example, similar to the first exemplary embodiment, components of respective color spaces of RGB, HSV, Lab, and YCbCr, and filter responses of the Gabor filter and the LoG filter may be used therefor. Further, in order to define the feature at each region, the training device 300 acquires statistics from the feature quantity that can be acquired at each pixel within the small region. Four statistics such as a mean, a standard deviation, a skewness, and a kurtosis are employed therefor. The skewness is the statistics indicating a degree of asymmetry of distribution, whereas the kurtosis is the statistics indicating a degree of concentration of distribution around the mean. Accordingly, the color feature will be 48 dimensions (i.e., 4 color spaces×3 components×4 statistics), whereas the number of dimensions of the texture feature corresponds to the number of filter responses×4 statistics. Further, in addition to the above feature quantities, barycentric coordinates or an area of the small region may be employed as the feature quantities.

Based on the likelihood acquired by the classifier and the existence probability of the small regions, the identification unit 504 realizes the class identification of the small regions by allocating the class having the highest posterior probability of the small regions by the following formula 10.

$$\hat{c}(R_i) = \underset{c \in Sc}{\operatorname{argmax}} P_{c|F=F(I,R_i)}(R_i) \quad \text{Formula 10}$$

The identification unit 504 executes the same processing with respect to all the small regions of the identification target image. In the present exemplary embodiment, the identification unit 504 executes the class identification at each region. However, in a same manner as the first exemplary embodiment, the identification unit 504 may execute the identification at each pixel, so as to average the existence probability in the small region. In such a case, at first, the identification unit 504 calculates the sum of the posterior probability at each class in the small region by the following formula 11.

$$P_c(R_i) = \sum_{(x,y) \in R_i} P_{c|F=F(I,x,y)}(x, y) \quad \text{Formula 11}$$

The identification unit 504 allocates the class having the highest posterior probability in the region by the following formula 12.

$$\hat{c}(R_i) = \underset{c \in N}{\operatorname{argmax}} P_c(R_i) \quad \text{Formula 12}$$

As described above, according to the present exemplary embodiment, the image recognition apparatus 20 estimates the existence probability distribution based on the image capturing information after segmenting the identification target image into small regions. Then, the image recognition apparatus 20 executes the class identification by using the estimated existence probability distribution, so that the class identification can be executed more precisely. With this configuration, precision of the region segmentation executed by the image recognition apparatus 20 can be improved.

In a third exemplary embodiment, in addition to estimating the existence probability distribution of the class by using the image capturing information, the image recognition apparatus 20 acquires similarity in feature quantity between the pixels by using at least any one of the image information and the image capturing information, and uses the similarity information indicating the similarity in order to execute the class identification. With this configuration, the image recognition apparatus 20 can further improve the precision of the region segmentation and the class identification.

By using the similarity, the image recognition apparatus 20 can execute the identification while taking the information of the predetermined adjacent pixels with respect to the target pixel into consideration, so that the precision of the region segmentation and the class identification can be improved. In the present exemplary embodiment, description will be given to a method for executing the identification in a pixel unit as described in the first exemplary embodiment. However, the identification may be executed at each of the previously-segmented small regions as described in the second exemplary embodiment.

Figure 14:
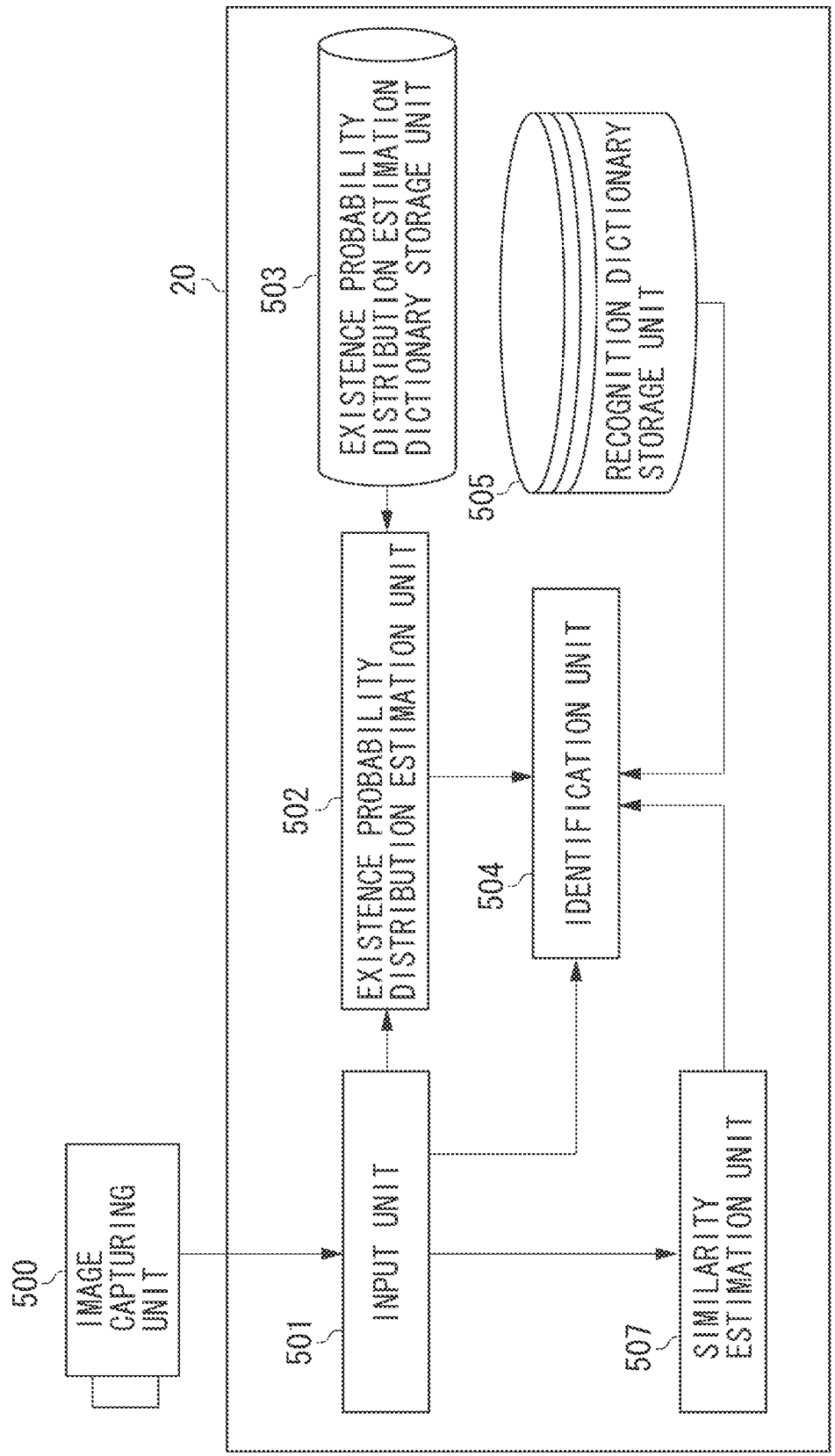
FIG. 14 is a diagram illustrating a first example of a functional configuration of an image recognition apparatus according to a third exemplary embodiment.

FIG. 14 is a diagram illustrating an example of a functional configuration of the image recognition apparatus 20 according to the present exemplary embodiment. The image recognition apparatus 20 according to the present exemplary embodiment includes a similarity estimation unit 507 in addition to the functional configuration illustrated in FIG. 5. The similarity estimation unit 507 will be described below in detail with reference to FIG. 15. The rest of the configurations are the same as those illustrated in FIG. 5, and thus the description thereof will be omitted.

Figure 15:
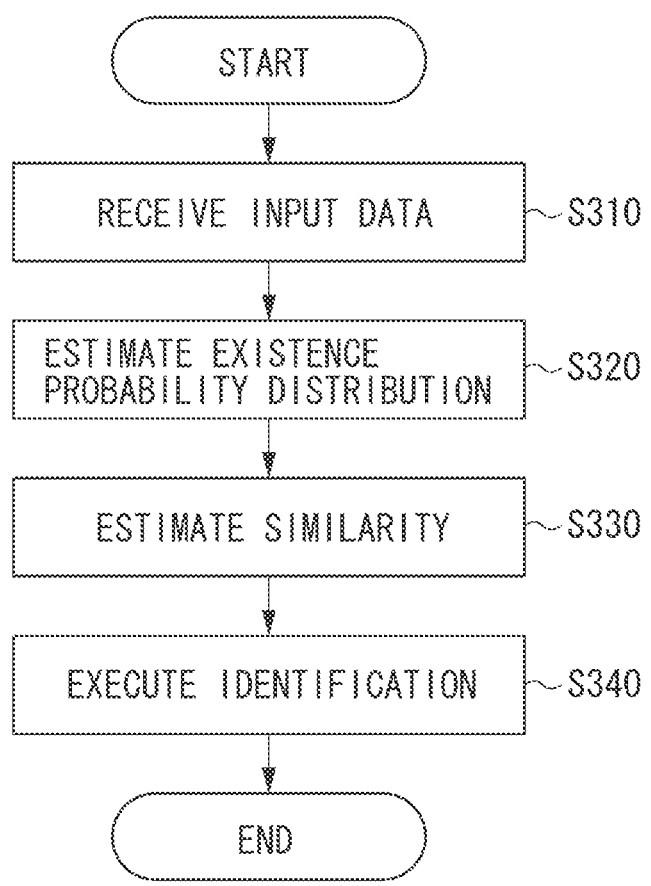
FIG. 15 is a flowchart illustrating a first example of processing according to the third exemplary embodiment.

FIG. 15 is a flowchart illustrating an example of processing for executing the region segmentation and the class identification of the region by using the similarity between the pixels, executed by the image recognition apparatus 20 according to the present exemplary embodiment.

The process in step S310 is the same as that in step S110, and thus the description thereof will be omitted.

The process in step S320 is the same as that in step S120, and thus the description thereof will be omitted.

In step S330, the similarity estimation unit 507 calculates the similarity between the pixels by using at least any one of the image information and the image capturing information. The similarity estimation unit 507 transmits the information relating to the estimated similarity (hereinafter, simply referred to as "similarity") to the identification unit 504. The process in step S330 will be described below in detail. In step S330, when the similarity estimation unit 507 only uses the image information, the input unit 501 only inputs the image information, and when the similarity estimation unit 507 only uses the image capturing information, the input unit 501 only inputs the image capturing information thereto. Then, when the similarity estimation unit 507 uses both the image information and the image capturing information, the input unit 501 inputs both the information thereto.

In step S340, the identification unit 504 identifies the class of each pixel of the identification target image received in step S310 by using the classifier stored in the recognition dictionary storage unit 505. At this time, the identification unit 504 identifies the class of each pixel based on the existence probability distribution estimated in step S320, the image information that can be acquired from the input image, and the similarity between the pixels estimated in step S330. The process in step S340 will be described below in detail.

According to the flowchart illustrated in FIG. 15, the processes in steps S330 and S340 will be described more specifically.

In step S330, the similarity estimation unit 507 calculates the similarity between the pixels by using at least any one of the image information and the image capturing information. In the present exemplary embodiment, the similarity is expressed by Gaussian kernel. Positions of the pixels, the similarity of which is calculated by the similarity estimation unit 507, are denoted as "$x_i$" and "$x_j$", while the image information or the image capturing information (i.e., feature quantity) that can be acquired at the positions of the pixels are denoted as "$f_i$" and "$f_j$" respectively. Thus, the similarity between the pixels $S(f_i, f_j)$ is defined by the following formula 13.

$$S(f_i, f_j) = \exp\left(-\frac{|p_i - p_j|^2}{2\theta_\alpha^2} - \frac{|Color_i - Color_j|^2}{2\theta_\beta^2}\right) \qquad \text{Formula 13}$$

In the above, a pixel position "p" and a color component vector "Color" are used for the image information (feature quantity) for defining the similarity. However, the image capturing information can be also used therefor. In such a case, the image capturing information $Ph_k(x_i)$ and $Ph_k(x_j)$ input in step S310 will be used. In this case, the similarity thereof can be defined by the following formula 14.

$$S(f_i, f_j) = \exp\left(-\frac{|Ph_k(x_i) - Ph_k(x_j)|^2}{2\theta_r^2}\right) \qquad \text{Formula 14}$$

Further, the similarity can be also expressed by the following formula 15 by combining the image information and the image capturing information.

$$S(f_i, f_j) = \exp\left(-\frac{|p_i - p_j|^2}{2\theta_\alpha^2} - \frac{|Color_i - Color_j|^2}{2\theta_\beta^2} - \frac{|Ph_k(x_i) - Ph_k(x_j)|^2}{2\theta_r^2}\right) \qquad \text{Formula 15}$$

"θα", "θβ", and "θγ" are hyper-parameters. These hyper-parameters may be acquired through cross-validation at the time of training the classifier described below, or may be determined by the user. Herein, description has been given to an example of estimating the similarity by selecting one image capturing information from among various kinds of image capturing information. In a case where another image capturing information is additionally used, the information thereof can be added by setting the hyper-parameter.

In step S340, the identification unit 504 identifies the class of each pixel by using the classifier. In the present exemplary embodiment, description will be given by using the conditional random field (CRF) discussed in P. Krahenbuhl, "Efficient Inference in Fully Connected CRFs with Gaussian Edge Potentials", Neural Information Processing Systems 2011. The conditional random field is a probabilistic framework capable of handling the labeling and segmentation of structured data. The conditional random field executes optimization of a sum of a potential of an element (node) itself (i.e., unary potential) and a potential that expresses a degree of relationship between elements (nodes) (i.e., pairwise potential). Herein, observation data is denoted as $X=(x_1, x_2, \ldots x_M)$. "M" represents the entire number of the observation data. In the present exemplary embodiment, "M" corresponds to the number of pixels. A relevant class label is denoted as $Y=(y_1, y_2 \ldots y_M)$. A value that can be taken by "$Y_i$" is denoted as $C=(c_1, c_2, \ldots c_N)$. "N" represents the number of class categories. The conditional random field (X, Y) is expressed by Gibbs distribution as indicated by the following formula 16.

$$P(Y|X) = \frac{1}{Z(X)}\exp(-E(Y)) \qquad \text{Formula 16}$$

Herein, Z(X) represents a partition function for normalizing the distribution, and E(Y) is a Gibbs energy expressed by the following formula 17.

$$E(Y) = \sum_i \psi_u(y_i) + \sum_{i<j} \psi_p(y_i, y_j) \qquad \text{Formula 17}$$

In the formula 17, $\Psi_u(y_i)$ represents the potential of each node (unary potential), whereas $\Psi_p(y_i, y_j)$ represents the potential of a degree of relationship between the nodes (pairwise potential). The unary potential is allocated to each node. In the present exemplary embodiment, the unary potential is allocated to each pixel. The unary potential can be defined by the following formula 18.

$$\psi_u(y_i) = -\log(\text{prob}(y_i)) \qquad \text{Formula 18}$$

In formula 18, "prob($y_i$)" represents probability indicating that the i-th pixel indicates a class category $y_i$. A probability value is a value that can be approximately acquired when a product of the likelihood and the existence probability, acquired for the identification employing the SVM described in the first exemplary embodiment, is converted by a sigmoid function.

Figure 16A:
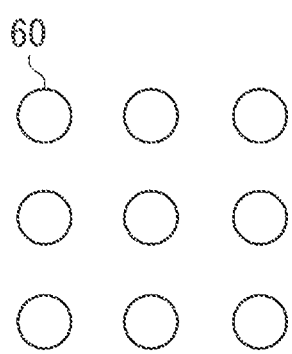
FIGS. 16A, 16B, and 16C are diagrams illustrating an example of combination between nodes.
Figure 16B:
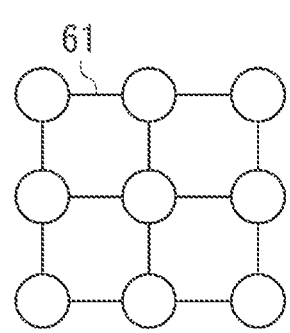
Figure 16C:
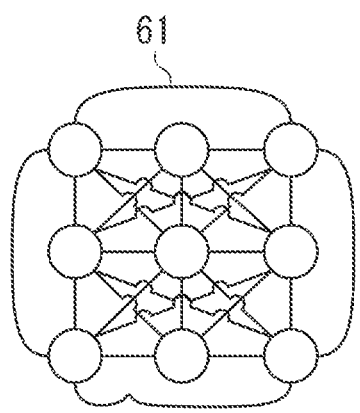

The pairwise potential will be described. As illustrated in FIGS. 16A to 16C, in the conditional random field, it is necessary to define the combination between the nodes. FIGS. 16A to 16C are diagrams illustrating an example of the combination between the nodes. Nodes 60 and combinations 61 between the nodes 60 are illustrated in FIGS. 16A to 16C. In FIG. 16B, only the adjacent nodes 60 are combined with each other, whereas in FIG. 16C, all of the nodes 60 are combined with each other. In the present exemplary embodiment, a totally-combined conditional random field as illustrated in FIG. 16C will be employed. The pairwise potential is expressed by the following formula 19.

$$\psi_p(y_i, y_j) = \mu(y_i, y_j) \cdot k(f_i, f_j) \qquad \text{Formula 19}$$

Herein, $\mu(y_i, y_j)$ is a function which expresses the compatibility between the labels, and a potts model as in the following formula 20 will be used therefor.

$$\mu(y_i, y_j) = [y_i \neq y_j] \qquad \text{Formula 20}$$

In this case, a penalty will be applied if different labels are applied to the nodes sharing high similarity therewith. In the present exemplary embodiment, a class co-occurrence matrix is trained for the function $\mu(y_i, y_j)$. In the above method, information indicating that certain class categories are likely to or unlikely to exist together, i.e., the co-occurrence of objects within the image will be used. For example, humans and cars, cars and bicycles, and humans and horses are likely to exist together, although horses and buses, and sheep and motorcycles are unlikely to exist together. When the class co-occurrence matrix is to be trained, for example, a matrix of "number of classes"×"number of classes" is provided, so that voting is executed on the cells of class categories cooperatively occurring in the same training image. Co-occurrence probability $\mu(C_i, C_j)$ of a class category $C_i$ and a class category $C_j$ in a class co-occurrence matrix $\mu$ is expressed by the following formula 21.

$$\mu(C_i, C_j) = \frac{(\text{Number of Co-Occurrence Images}) + \gamma}{(\text{Entire Number of Training Images}) + \delta} \qquad \text{Formula 21}$$

Herein, "γ", and "δ" are positive constants for normalizing the co-occurrence probability, and these constants are previously determined when the training is executed.

Now, "k($f_i$, $f_j$)" is a function defined by the feature quantity, and expressed by the following formula 22 by using the similarity defined by the formulas 13 to 15.

$$k(f_i, f_j) = \omega_1 S(f_i, f_j) + \omega_2 \exp\left(-\frac{|p_i - p_j|^2}{2\theta_\varepsilon^2}\right) \quad \text{Formula 22}$$

The second term of the formula 22 is a smoothness kernel. In the formula 22, only a position of the pixel is taken into consideration. However, the image capturing information may be also taken into consideration.

In a case where the image capturing information is taken into consideration, the function k($f_i$, $f_j$) can be expressed by the following formula 23.

$$k(f_i, f_j) = \omega_1 S(f_i, f_j) + \omega_2 \exp\left(-\frac{|Ph_k(x_i) - Ph_k(x_j)|^2}{2\theta_{\varepsilon'}^2}\right) \quad \text{Formula 23}$$

In this formula, "$\omega_1$" and "$\omega_2$" are weights of the kernels, whereas "$\theta\varepsilon$" is a hyper-parameter. Similar to "$\theta$" described earlier, these values may be acquired through the cross-validation when the training is executed. With respect to the conditional random field defined by the above-described formulas, Maximum A Posteriori (MAP) estimation expressed by the following formula 24 is executed, so that the class of each node is determined.

$$Y = \underset{Y \in L^N}{\arg\max} P(Y \mid X) \quad \text{Formula 24}$$

In the above formula 24, $L^N$-ways of combination of all the class categories have to be calculated in order to acquire an exact solution for P(Y|X). However, the calculation cost with respect to M-number of pixels can be reduced to a linear order by employing a method in which mean field approximation and high-dimensional filtering, discussed in P. Krahenbuhl, "Efficient Inference in Fully Connected CRFs with Gaussian Edge Potentials", Neural Information Processing Systems 2011, are combined with each other.

Through the above processing, the identification unit 504 can identify the classes of all the pixels in the identification target image, and segment the identification target image into regions by defining the conditional random field that takes each pixel as a node to execute the MAP estimation.

Although the processing according to the present exemplary embodiment has been described by employing the conditional random field, another classifier such as the recursive neural networks (RNNs) discussed in R. Socher, "Parsing Natural Scenes and Natural Language with Recursive Neural Networks", International Conference on Machine Learning 2011 may be also employed. In this case, the estimated similarity may be used as one of the feature quantities of the classifier. As described above, by using the similarity between the pixels in addition to estimating the existence probability distribution of the class based on the image capturing information, the image recognition apparatus 20 according to the present exemplary embodiment can identify the class of each pixel of the identification target image more precisely, so as to be able to improve the precision of the region segmentation.

Figure 17:
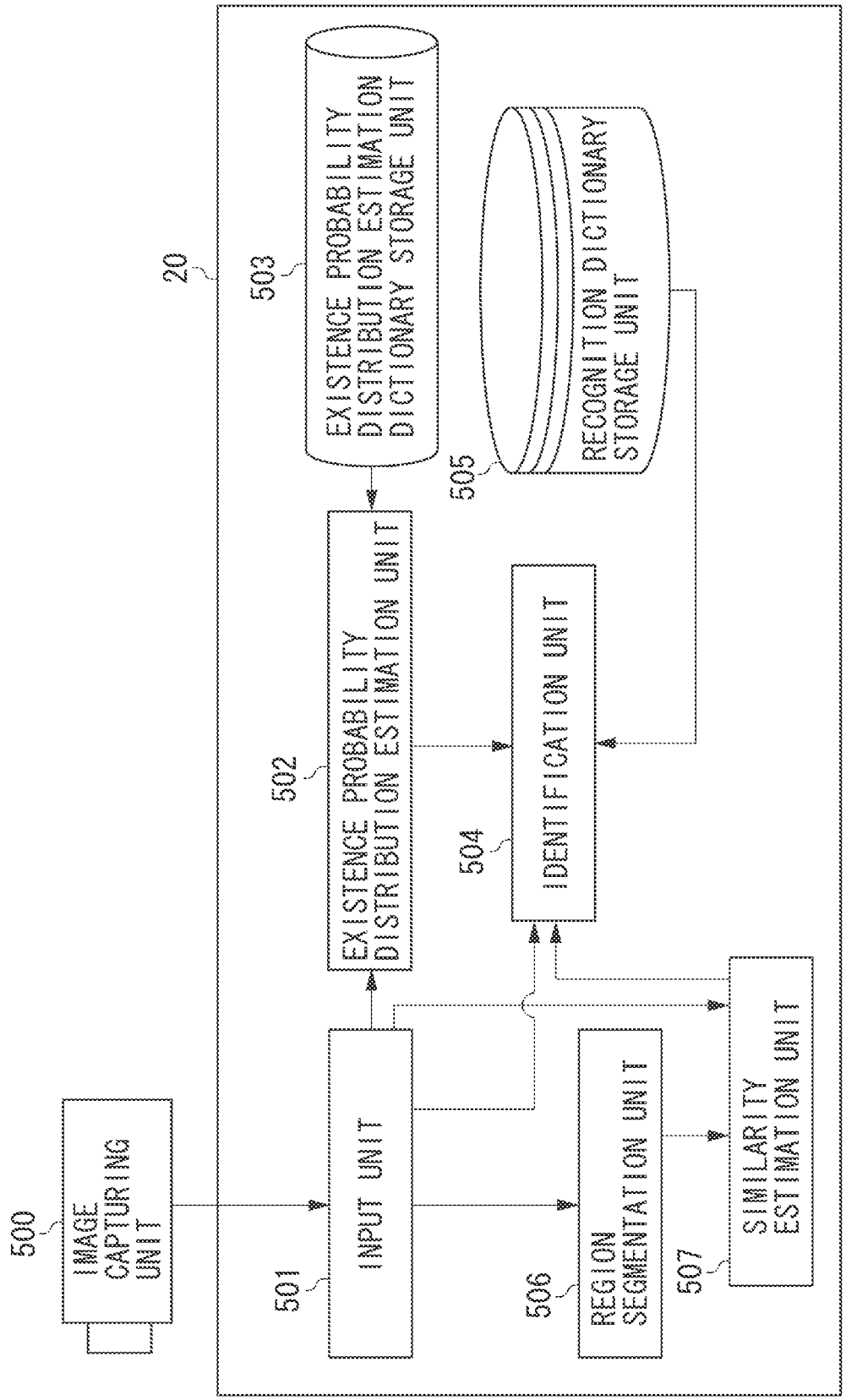
FIG. 17 is a diagram illustrating a second example of the functional configuration of the image recognition apparatus according to the third exemplary embodiment.

Further, in the present exemplary embodiment, description has been given by setting a node as a unit of the pixel. However, the region segmentation may be executed in advance, so that the class of each region is identified by using the conditional random field that takes each of the regions as a node. In this case, the image recognition apparatus 20 having the functional configuration illustrated in FIG. 17 will be employed. FIG. 17 is a diagram illustrating an example of the functional configuration of the image recognition apparatus 20 according to the present exemplary embodiment. The functional configuration of the image recognition apparatus 20 illustrated in FIG. 17 includes the region segmentation portion 506 in addition to the functional configuration illustrated in FIG. 14.

Figure 18:
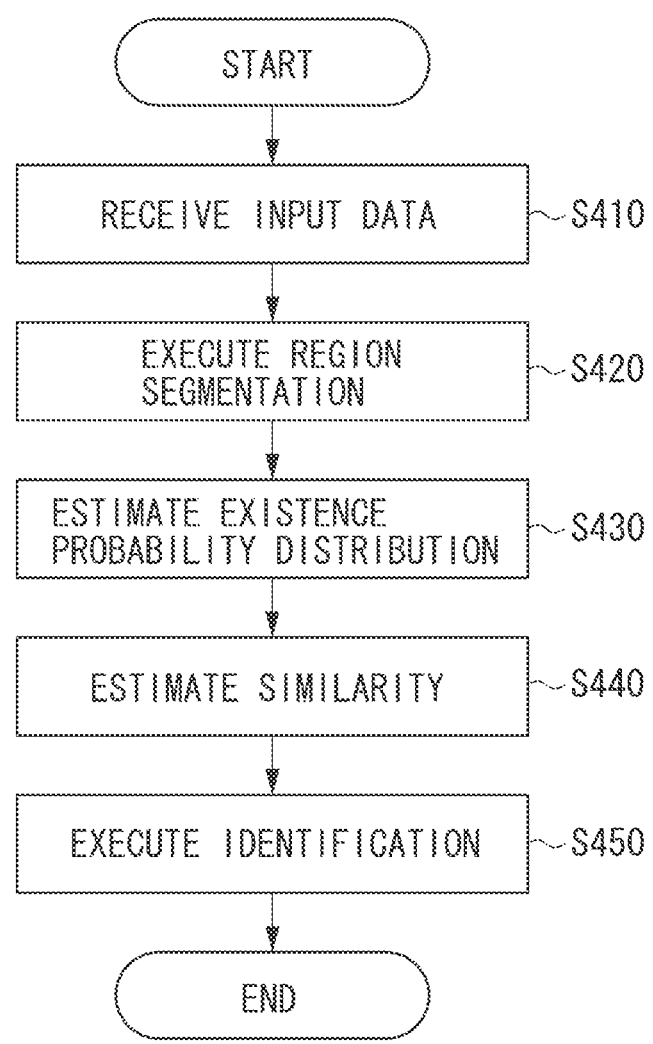
FIG. 18 is a flowchart illustrating a second example of the processing according to the third exemplary embodiment.

FIG. 18 is a flowchart illustrating an example of processing executed by the image recognition apparatus 20 including the functional configuration of FIG. 17.

Although detailed description will be omitted because the processing illustrated in FIG. 18 has already been described above, in step S440, the similarity estimation unit 507 acquires the similarity between the regions instead of acquiring the similarity between the pixels. Description will now be given to a method in which the similarity estimation unit 507 acquires the similarity between the regions based on the similarity in histograms of feature quantity that can be acquired from the image capturing information of the regions.

The regions are respectively denoted as "$R_i$" and "$R_j$", and the similarity between the regions is denoted as S($R_i$, $R_j$). Then, the histogram of the image capturing information $Ph_k$(x, y) of the region $R_i$ is denoted as hist($R_i$, 1) while "x" and "y" here indicate the pixels included in the region $R_i$. Further, the number of bins is denoted as whereas an index for indicating a certain bin is denoted as 1(1=1, 2, ... L). In this case, the similarity S($R_i$, $R_j$) between the regions is expressed by the following formula 25.

$$S(R_i, R_j) = \frac{\sum_{l=1}^{L} \min(\text{hist}(R_i, l), \text{hist}(R_j, l))}{\sum_{l=1}^{L} \text{hist}(R_i, l)} \quad \text{Formula 25}$$

Further, as another method for calculating the similarity, the similarity estimation unit 507 may employ a method for calculating the similarity by acquiring a distance between the histograms. Furthermore, in addition to the above, the similarity estimation unit 507 may employ a plurality of pieces of image capturing information or feature quantities that can be acquired from the image.

As described above, according to the present exemplary embodiment, the image recognition apparatus 20 can identify the class by using the similarity in feature quantity between the pixels or the previously-segmented regions. With this configuration, the image recognition apparatus 20 can identify the class more precisely, so as to be able to improve the region segmentation.

In a fourth exemplary embodiment, in addition to estimating the existence probability distribution of the class by using the image capturing information, the image recognition apparatus 20 acquires similarity between the regions by using at least any one of the image information and the image capturing information, and integrates the segmented small regions by using the similarity. Then, the image recognition apparatus 20 identifies the class of the integrated region by using the classifier.

Figure 19:
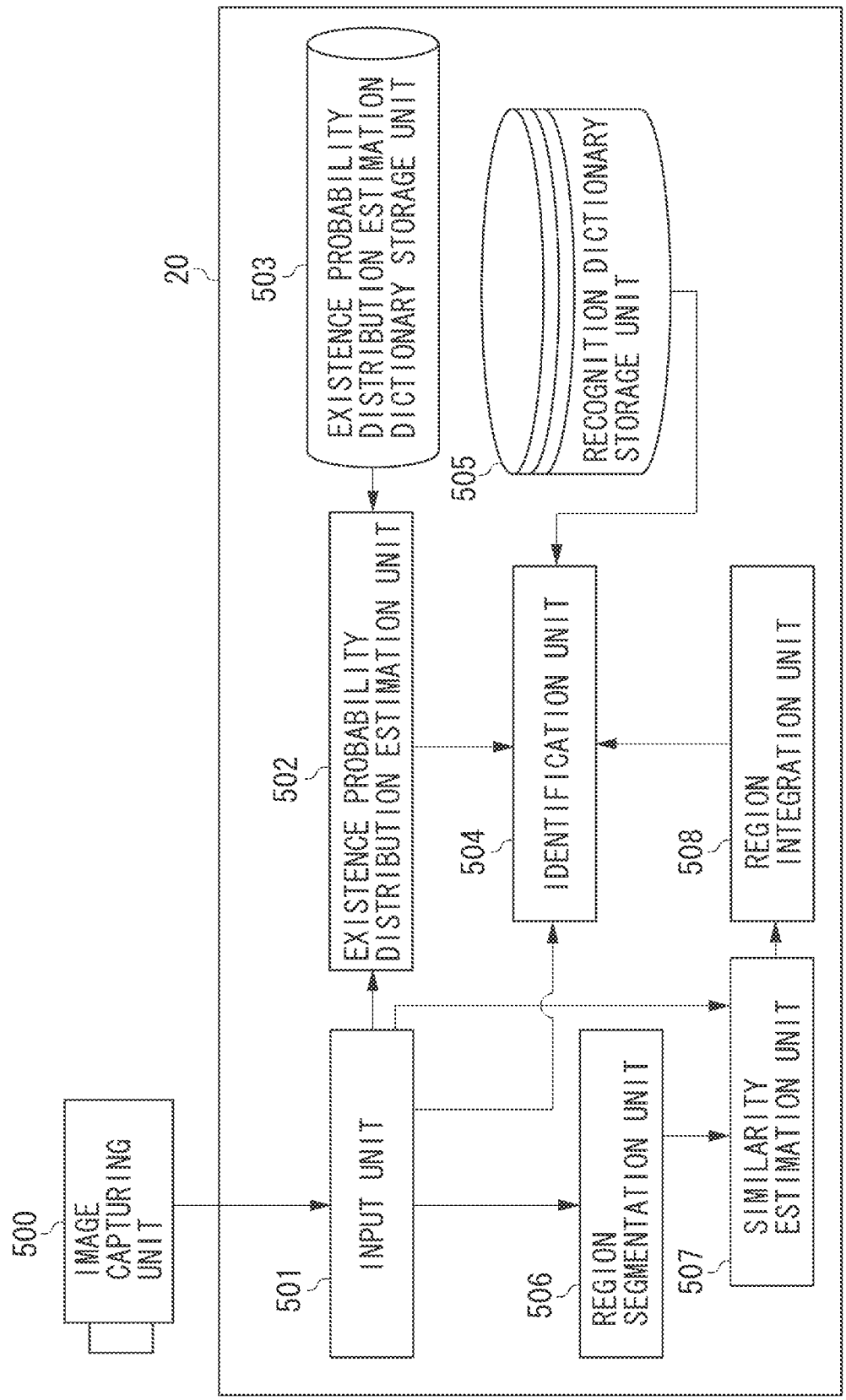
FIG. 19 is a diagram illustrating an example of a functional configuration of an image recognition apparatus according to a fourth exemplary embodiment.

FIG. 19 is a diagram illustrating an example of a functional configuration of the image recognition apparatus 20 according to the present exemplary embodiment. The image recognition apparatus 20 illustrated in FIG. 19 further includes the region segmentation unit 506, the similarity estimation unit 507, and a region integration unit 508 in addition to the functional configuration illustrated in FIG. 5. These functions will be described below in detail with reference to FIG. 20. Because the image recognition apparatus 20 executes the class identification after integrating the small regions by using the similarity, the robustness thereof can be improved in comparison to the case where the class identification is only executed with respect to the small regions.

Figure 20:
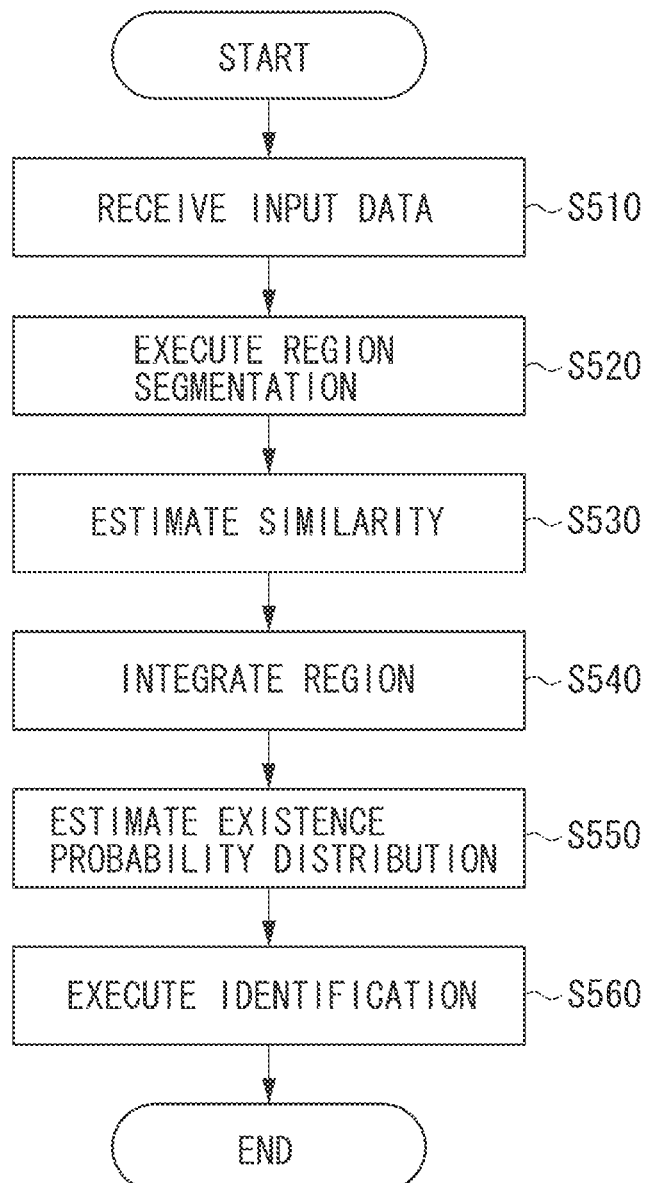
FIG. 20 is a flowchart illustrating an example of processing according to the fourth exemplary embodiment.

FIG. 20 is a flowchart illustrating an example of processing for segmenting the identification target image into regions, integrating the segmented regions based on the similarity between the regions, and identifying the class of the integrated region, executed by the image recognition apparatus 20.

The process in step S510 is the same as that in step S210, and thus the description thereof will be omitted.

The process in step S520 is the same as that in step S220, and thus the description thereof will be omitted.

In step S530, the similarity estimation unit 507 acquires similarity between the regions defined by the formula 21. The similarity estimation unit 507 transmits the estimated similarity to the region integration unit 508.

Figure 21C:
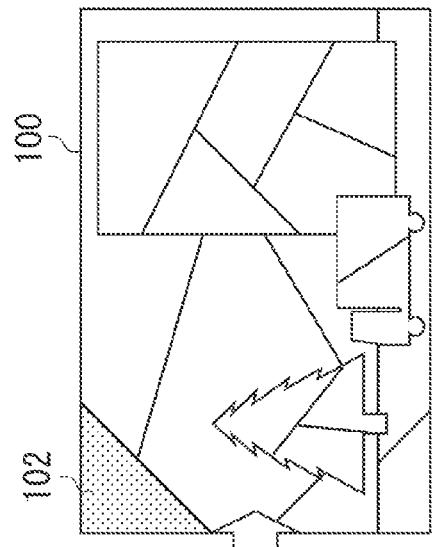
FIGS. 21A, 21B, and 21C are diagrams illustrating a sixth example of the identification target image.
Figure 21B:
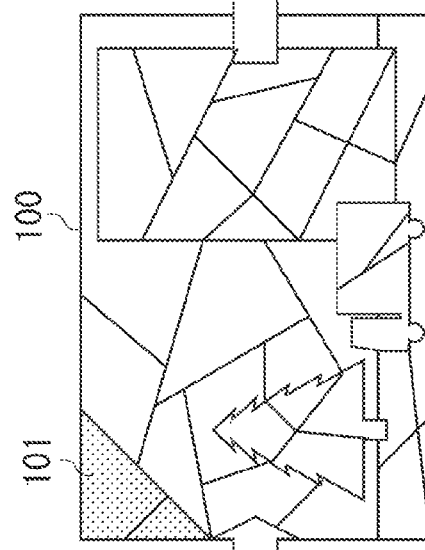
Figure 21A:
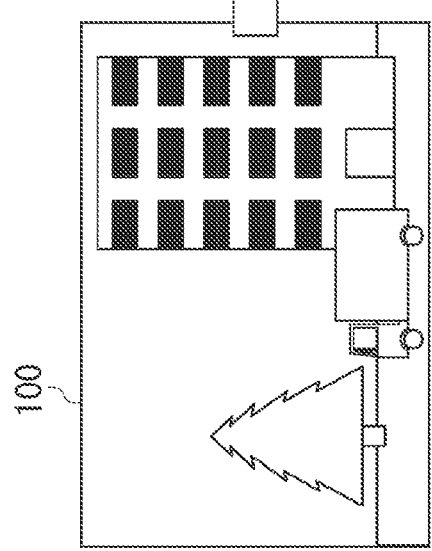

In step S540, the region integration unit 508 integrates the adjacent small regions generated (segmented) in step S520 based on the similarity between the regions estimated in step S530. An example of the region integration executed by the region integration unit 508 is illustrated in FIGS. 21A to 21C. FIGS. 21A to 21C are diagrams illustrating an example of region segmentation and region integration.

The region integration unit 508 integrates the small regions 101 of the identification target image 100 which are adjacent to each other, which have the similarity values greater than a predetermined threshold value. An integrated region 102 is illustrated in FIG. 21C. More specifically, in a case where a region of a wall or the sky is segmented into small regions, the region integration unit 508 can integrate the small regions by using a mean or a variance of distance values in the small regions. The region integration unit 508 calculates the similarity between the adjacent small regions, so as to integrate the small regions if a value of the similarity thereof is greater than a predetermined threshold value. The region integration unit 508 transmits information of the integrated region (hereinafter, simply referred to as "integrated region") to the identification unit 504.

In step S550, the existence probability distribution estimation unit 502 estimates the existence probability distribution of the integrated region integrated in step S540. The estimation method is the same as that described in the second exemplary embodiment, and thus the description thereof will be omitted.

In step S560, the identification unit 504 identifies the class of each integrated region by using the existence probability distribution estimated in step S550. The estimation method is the same as that described in the second exemplary embodiment, and thus the description thereof will be omitted.

As described above, according to the present exemplary embodiment, the image recognition apparatus 20 can improve the precision of the region segmentation by integrating the small regions by using the similarity in addition to using the existence probability distribution estimated from the image capturing information.

In a fifth exemplary embodiment, the image recognition apparatus 20 executes scene estimation to estimate the existence probability distribution of the class by using a result of the scene estimation (scene information) in addition to estimating the existence probability distribution of the class by using the image capturing information. The scene may be a captured scene such as an outdoor view, a night view, a landscape, or a portrait, or may be an image captured in the scene such as an office, a snow mountain, or the ocean.

Figure 22:
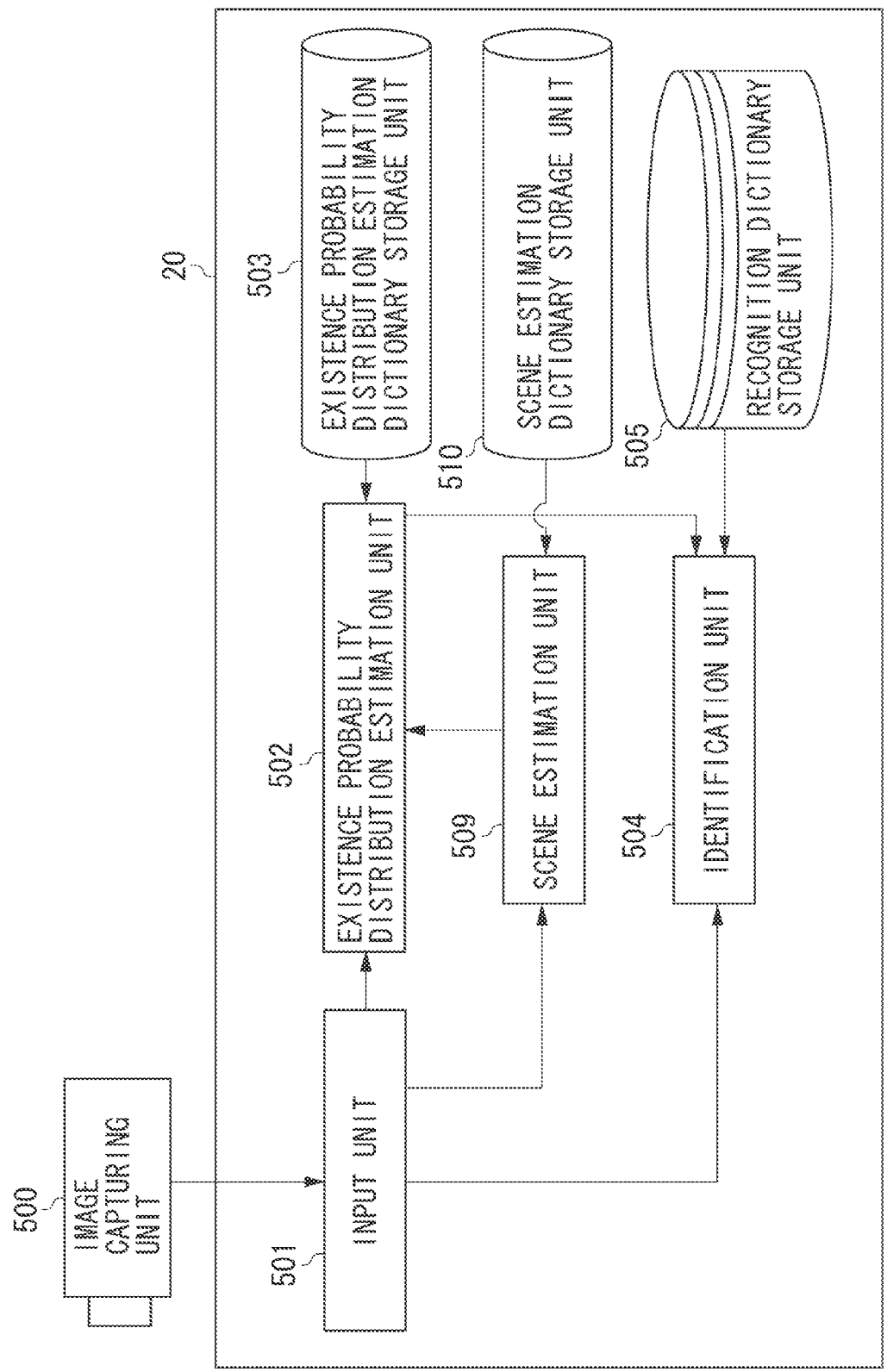
FIG. 22 is a diagram illustrating a first example of a functional configuration of an image recognition apparatus according to a fifth exemplary embodiment.

FIG. 22 is a diagram illustrating an example of a functional configuration of the image recognition apparatus 20 according to the present exemplary embodiment. The functional configuration of the image recognition apparatus 20 illustrated in FIG. 22 further includes a scene estimation unit 509 and a scene estimation dictionary storage unit 510 as storage units in addition to the functional configuration illustrated in FIG. 5. These functions will be described below in detail with reference to FIG. 23. Further, the image recognition apparatus 20 can estimate the existence probability distribution of the class by using a result of object detection. Description will be also given below with respect to a method for estimating the existence probability distribution of the class by using a result of object detection, in particular, a result of face detection or human body detection, executed by the image recognition apparatus 20.

Figure 23:
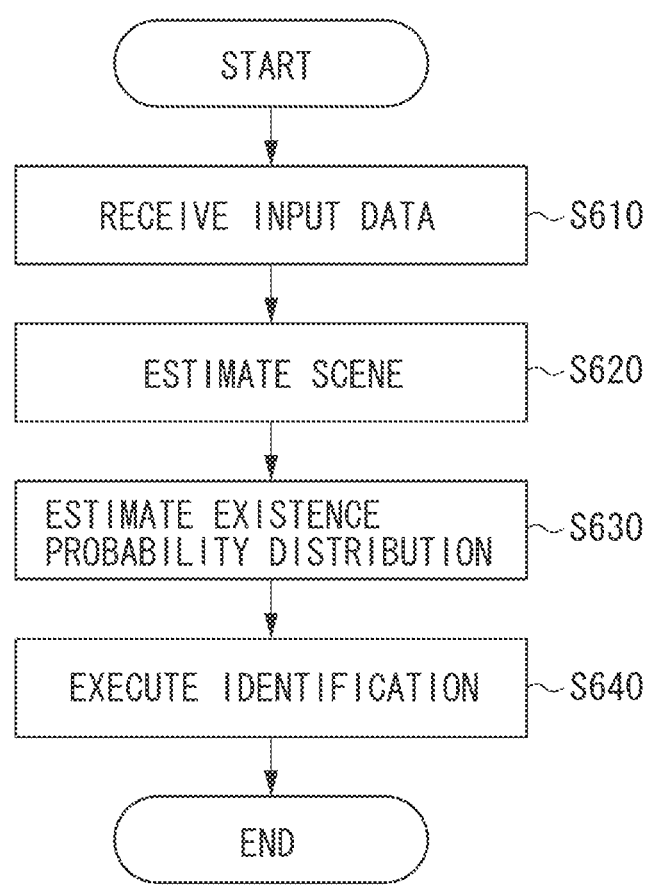
FIG. 23 is a flowchart illustrating a first example of processing according to the fifth exemplary embodiment.

FIG. 23 is a flowchart illustrating an example of processing for executing the region segmentation and class identification of the region by using a result of scene estimation, executed by the image recognition apparatus 20 according to the present exemplary embodiment.

The process in step S610 is the same as that in step S110, and thus the description thereof will be omitted.

In step S620, the scene estimation unit 509 estimates a scene of the identification target image by using at least any one of the image information and the image capturing information. Now, a scene estimation method using the classifier will be described. More specifically, the scene estimation method using the SVM with a bag-of-words method will be described. In the bag-of-word method, the feature quantity is converted to a visual word, and a frequency histogram which indicates how frequent the visual word appears in the image is trained by the classifier.

For example, the feature quantity is converted to the visual word by K-means algorithm. The image information or the image capturing information may be used for the feature quantity that is to be converted to the visual word. For example, a scale-invariant feature transform (SIFT) feature amount extracted from the image in a grid-like manner may be used as the image information, whereas a distance value acquired at each range-finding point may be used as the image capturing information. In a case where both the image information and the image capturing information are to be used, the feature quantities acquired from respective pieces of the information are converted to the frequency histograms, and the frequency histograms are joined together and trained by the classifier as the feature quantity. Further, in a case where the scene estimation unit 509 uses the image capturing information such as the GPS information or the information of captured date and time, the scene estimation unit 509 may firstly select a classifier according to the image capturing information, so as to identify the scene through the selected classifier. With this configuration, the scene estimation unit 509 can identify the scene corresponding to the GPS information or the information of captured date and time.

The data in which a name of one scene from among defined scenes is applied to the image may be provided as the training data of the classifier. Although the scene estimation unit 509 may determine just one scene to execute scene estimation, the number of scenes does not have to be limited to one. In the present exemplary embodiment, the scene estimation unit 509 estimates the likelihood of respective defined scenes. When the number of scenes is denoted as N-scene, the scene estimation unit 509 outputs a scene likelihood matrix configured of matrices of 1×N-scenes, including the likelihood of each scene as an element. The scene estimation unit 509 transmits the information of the scene likelihood matrix as an estimation result (hereinafter, simply referred to as "scene likelihood matrix") to the existence probability distribution estimation unit 502.

In step S630, the existence probability distribution estimation unit 502 estimates the existence probability distribution of the class by using a result of the scene estimation estimated in step S620 and the image capturing information. In the present exemplary embodiment, the image capturing information is denoted as $Ph_k$, while "$_k$" is an index for indicating the image capturing information. Based on the image capturing information $Ph_k(x, y)$ input in step S610, the existence probability distribution estimation unit 502 estimates the existence probability distribution of the class at each of predetermined positions of the identification target image. In the present exemplary embodiment, the existence probability distribution of the class corresponding to the position of each pixel is denoted as $P_c(x, y)$, while "$_c$" is an index for indicating a class category.

Similar to the first exemplary embodiment, in the present exemplary embodiment, the setting function $g_c$ that takes the image capturing information as an input while taking the existence probability distribution of the class as an output is trained in advance. Therefore, the existence probability distribution $P_c(x, y)$ of the class corresponding to the position of the pixel is estimated by the following formula 26.

$$Pc(x,y)=g_c(Ph_1(x,y),Ph_2(x,y),\ldots,Ph_k(x,y))*Pc(Sc) \quad \text{Formula 26}$$

Herein, Pc(Sc) is the existence probability of the class "c" acquired from the scene likelihood matrix estimated in step S620. For example, in the scene estimation result, the likelihood of "outdoor" is higher than the other likelihood. In this case, the existence probability of the sky category will be higher than the other existence probabilities. Therefore, frequency of each of the class categories that constitutes the training image of the scene has to be added up in advance when the training is executed. More specifically, the frequency thereof may be acquired by adding up the number of pixels of the class categories of a training image group of the scene. The existence probability distribution $P_c(x, y)$ of each of the classes may be defined by the following formula 27.

$$Pc(x,y)=g_c(Ph_1(x,y),Ph_2(x,y),\ldots,Ph_k(x,y),Pc(Sc)) \quad \text{Formula 27}$$

In the present exemplary embodiment, Pc(Sc) is acquired from a product sum of the likelihood of the class category "c" of each trained scene and the probability of each scene. Similar to the first exemplary embodiment, the data in which the class category of the pixel is defined as illustrated in FIGS. 7A and 7B may be provided as the training data. In addition to the above, a scene name of a target image has to be defined.

As described above, the existence probability distribution estimation unit 502 can estimate the existence probability distribution of the class at each of the predetermined positions of the identification target image.

The process in step S640 is the same as that in step S130, and thus the description thereof will be omitted.

Through the above processing, the image recognition apparatus 20 can improve the precision of region segmentation by employing the existence probability distribution of the class which is estimated by taking the scene estimation result into consideration.

Further, the existence probability distribution of the class may be estimated by using an object detection unit besides the scene estimation unit 509.

Figure 24:
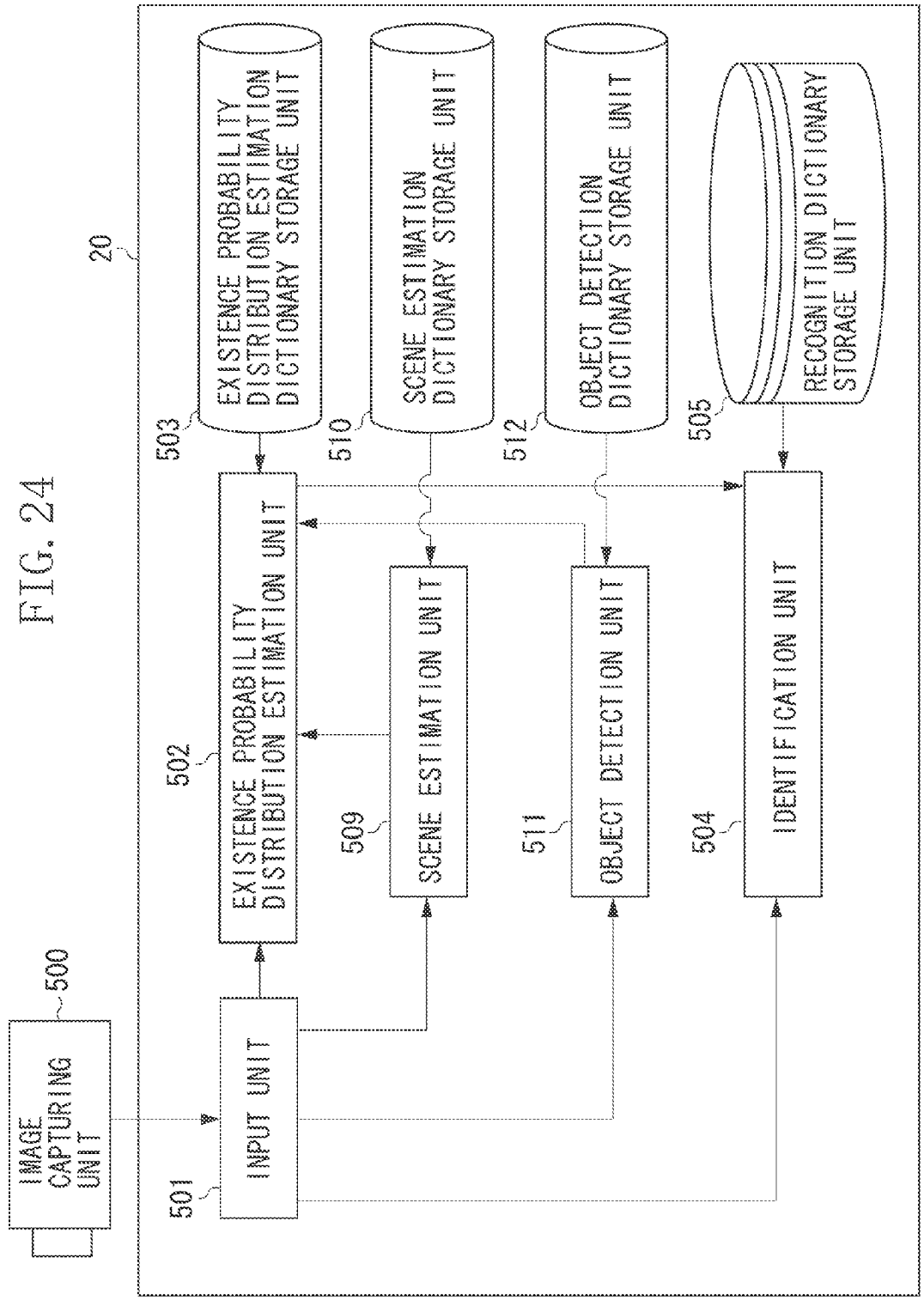
FIG. 24 is a diagram illustrating a second example of the functional configuration of the image recognition apparatus according to the fifth exemplary embodiment.

In this case, the functional configuration of the image recognition apparatus 20 illustrated in FIG. 24 will be employed. FIG. 24 is a diagram illustrating an example of the functional configuration of the image recognition apparatus 20 for estimating the existence probability distribution of each class by using the object detection unit. The functional configuration of the image recognition apparatus 20 illustrated in FIG. 24 further includes an object detection unit 511 and an object detection dictionary storage unit 512 as a storage unit in addition to the functional configuration illustrated in FIG. 22.

Figure 25:
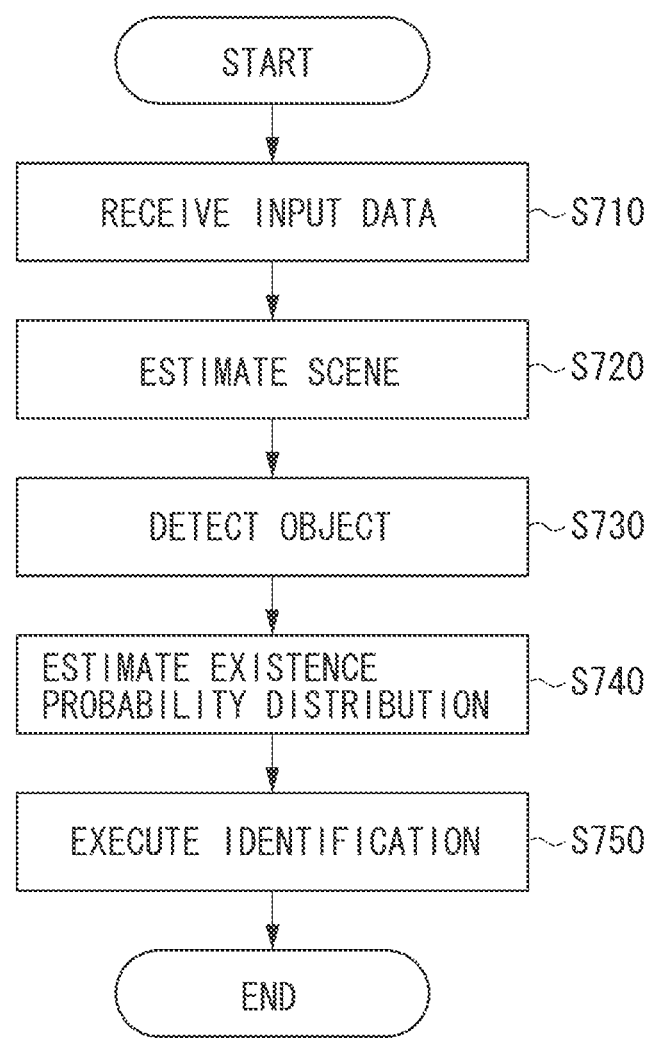
FIG. 25 is a flowchart illustrating a second example of the processing according to the fifth exemplary embodiment.

FIG. 25 is a flowchart illustrating an example of the processing executed by the image recognition apparatus 20 including the functional configuration illustrated in FIG. 24.

Figure 26A:
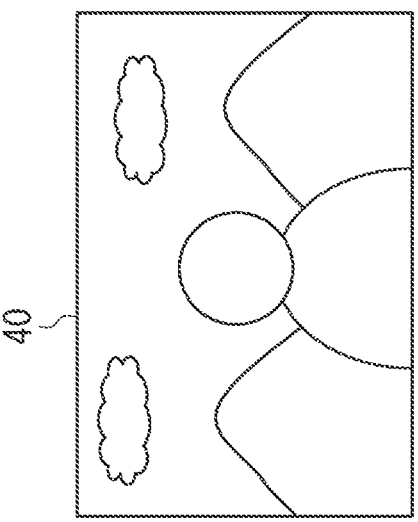
FIGS. 26A, 26B, and 26C are diagrams illustrating an example of object detection.
Figure 26B:
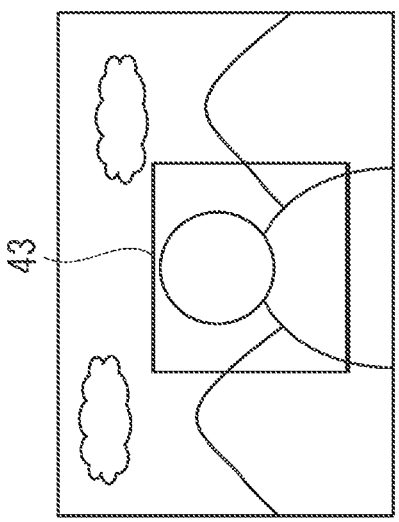
Figure 26C:
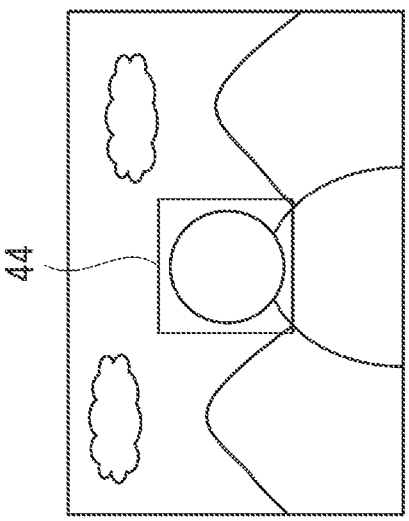

The processes in steps S710 and S720 are the same as those in steps S610 and S620, and thus the description thereof will be omitted. Further, the process in step S750 is the same as that in step S640, and thus the description thereof will be omitted. In step S730, the object detection unit 511 executes object detection of the identification target image. In the present exemplary embodiment, the processing employing human body detection and face detection as illustrated in FIGS. 26B and 26C respectively will be described. However, any kinds of object detection may be employed therefor as long as the classifier can be trained by previously setting a target object. FIGS. 26A to 26C are diagrams illustrating an example of the object detection.

Although description of the training method of each object detection unit will be omitted, for example, an object detection unit to which a deformable parts model is defined, which is discussed in P. Felzenszwalb, "A Discriminatively Trained, Multiscale, Deformable Part Model", Computer Vision and Pattern Recognition 2008, may be employed.

In step S740, the existence probability distribution estimation unit 502 estimates the existence probability distribution of the class by using a result of scene estimation estimated in step S720, a result of object detection (detection information) detected in step S730, and image capturing information. By using the setting function $g_c$, the existence probability distribution estimation unit 502 can estimate the existence probability distribution $P_c(x, y)$ of the class corresponding to the position of each pixel by the following formula 28 or 29.

$$\begin{aligned}Pc(x,y)=&g_c(Ph_1(x,y),Ph_2(x,y),\ldots,Ph_k(x,y))*Pc(Sc)\\&*Pc(O_1)*Pc(O_2)\end{aligned} \quad \text{Formula 28}$$

$$Pc(x,y)=g_c(Ph_1(x,y),Ph_2(x,y),\ldots,Ph_k(x,y),Pc(Sc),Pc(O_1),Pc(O_2)) \quad \text{Formula 29}$$

In the formulas 28 and 29, Pc(O1) and Pc(O2) are the existence probability of the class categories acquired from a result of the object detection estimated in step S730.

In a case where a result of the human body detection or the face detection is used as described in the present exemplary embodiment, for example, the existence probability of the human class category is higher than the existence probabilities of other class categories. The existence probability of the human class category according to the result of the human body detection is denoted as $P_{c=body}(O_{body})$. Further, the existence probability of the class category other than the human class category is denoted as $P_{c \neq body}(O_{body})$. For example, in a case where the result of the human body detection is extracted from a rectangular region 43 as illustrated in FIG. 26B, $P_{c=body}(O_{body})$ and $P_{c \neq body}(O_{body})$ within the rectangular region 43 are expressed by the following formulas 30 and 31.

$$P_{c=body}(O_{body}) = \frac{1}{N} + \frac{N-1}{N} Pr(\text{body})$$ Formula 30

$$P_{c \neq body}(O_{body}) = \frac{1 - Pr(\text{body})}{N - 1}$$ Formula 31

Herein, a score according to the human body detection unit will be used for "Pr(body)". Further, $P_{c=body}(O_{body})$ and $P_{c \neq body}(O_{body})$ in the regions other than the rectangular region 43 are expressed by the following formula 32.

$$P_{c=body}(O_{body}) = P_{c \neq body}(O_{body}) = \frac{1}{N}$$ Formula 32

Furthermore, the existence probability of the human class category according to a result of the face detection is denoted as $P_{c=body}(O_{face})$. Further, the existence probability of the class category other than the human class category is denoted as $P_{c \neq body}(O_{face})$. For example, in a case where the result of the face detection is extracted from a rectangular region 44 as illustrated in FIG. 26C $P_{c=body}(O_{face})$ and $P_{c \neq body}(O_{face})$ within the rectangular region 44 are expressed by the following formulas 33 and 34.

$$P_{c=body}(O_{face}) = \frac{1}{N} + \frac{N-1}{N} Pr(\text{face})$$ Formula 33

$$P_{c \neq body}(O_{face}) = \frac{1 - Pr(\text{face})}{N - 1}$$ Formula 34

Herein, a score according to the face detection unit will be used for "Pr(face)". Further, $P_{c=body}(O_{face})$, and $P_{c \neq body}(O_{face})$ in the regions other than the rectangular region 44 are expressed by the following formula 35.

$$P_{c=body}(O_{face}) = P_{c \neq body}(O_{face}) = \frac{1}{N}$$ Formula 35

A result of other object detection unit will be calculated in a same manner as the above.

As described above, according to the present exemplary embodiment, because the image recognition apparatus 20 employs the existence probability distribution of the class estimated by taking a result of the scene estimation and a result of the object detection into consideration in addition to the existence probability distribution estimated from the image capturing information, the precision of the region segmentation can be improved.

Similar to the second exemplary embodiment, the image recognition apparatus 20 may execute the class identification of the small regions after executing the region segmentation. Further, similar to the third and the fourth exemplary embodiments, the image recognition apparatus 20 may include a similarity estimation unit, so that the image recognition apparatus 20 may integrate the small regions or identify the class of the regions by using the similarity estimated by the similarity estimation unit.

The present invention is also realized by executing the following processing. In other words, software (program) for realizing the function of the above-described exemplary embodiments is supplied to a system or an apparatus via a network or various storage media, so that a computer (or a CPU or a micro processing unit (MPU)) of the system or the apparatus reads and executes the program.

According to the above-described exemplary embodiments, the image recognition apparatus 20 can precisely identify the class relating to the classification of the object at each region of the image.

While the present invention has been described in detail with reference to the preferred exemplary embodiments, the present invention is not limited to the above-described specific exemplary embodiments, and many variations and modifications are possible within the essential spirit of the present invention described in the scope of appended claims.

According to the aspect of the present invention, the class relating to the classification of the object can be precisely identified at each region of the image.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-220439 filed Oct. 23, 2013, which is hereby incorporated by reference herein in its entirety.

What is claimed is:

1. An image processing apparatus comprising:
   an acquisition unit configured to acquire image capturing information when an object has been captured;
   an estimation unit configured to estimate, based on the image capturing information acquired by the acquisition unit, an existence probability of a least one of classes which indicate classification of the object at each of predetermined regions of a captured image of the object; and
   an identification unit configured to identify the class at each of the regions based on the existence probability estimated by the estimation unit and on image information relating to the captured image.

2. The image processing apparatus according to claim 1, wherein the acquisition unit acquires the captured image together with the image capturing information; and
   wherein the estimation unit estimates the existence probability at each of the predetermined regions of the captured image acquired by the acquisition unit based on the image capturing information acquired by the acquisition unit.

3. The image processing apparatus according to claim 1, wherein the estimation unit estimates the existence probability at each of the regions based on the image capturing information by taking the predetermined regions as pixels of the captured image.

4. The image processing apparatus according to claim 1, further comprising a segmentation unit configured to segment the captured image into regions configured of at least one or more pixels,
wherein the estimation unit estimates the existence probability at each of the regions based on the image capturing information by taking the predetermined regions as regions segmented by the segmentation unit.

5. The image processing apparatus according to claim 1, wherein the estimation unit estimates the existence probability at each of the regions based on training information in which a relationship between the image capturing information and the existence probability is stored in advance.

6. The image processing apparatus according to claim 1, further comprising a similarity estimation unit configured to estimate similarity in features between the regions,
wherein the identification unit identifies the class at each of the regions based on the existence probability, the image information, and similarity information that indicates the similarity estimated by the similarity estimation unit.

7. The image processing apparatus according to claim 6, wherein the similarity estimation unit estimates similarity in features between the regions based on at least any one of the image capturing information and the image information.

8. The image processing apparatus according to claim 1, further comprising:
a similarity estimation unit configured to estimate similarity in features between the regions; and
an integration unit configured to integrate a plurality of regions in the captured image based on similarity information indicating the similarity estimated by the similarity estimation unit;
wherein the estimation unit estimates the existence probability at each of the regions integrated by the integration unit based on the image capturing information.

9. The image processing apparatus according to claim 1, further comprising a scene estimation unit configured to estimate a scene relating to capturing an image,
wherein the estimation unit estimates the existence probability at each of the regions based on the image capturing information and scene information relating to the scene estimated by the scene estimation unit.

10. The image processing apparatus according to claim 9, wherein the scene estimation unit estimates the scene based on at least any one of the image capturing information and the image information.

11. The image processing apparatus according to claim 1, further comprising a detection unit configured to detect a target object previously set from the captured image,
wherein the estimation unit estimates the existence probability at each of the regions based on the image capturing information and detection information relating to the target object detected by the detection unit.

12. The image processing apparatus according to claim 11, wherein the detection unit detects a human body and a human face from the captured image as the target objects.

13. The image processing apparatus according to claim 1, wherein the acquisition unit acquires the captured image captured by an image capturing unit and the image capturing information acquired when the image capturing unit captures the object.

14. An image processing method executed by an image processing apparatus, the method comprising:
acquiring image capturing information when an object has been captured;
estimating, based on the acquired image capturing information, an existence probability of at least one of classes which indicate classification of the object at each of predetermined regions of a captured image of the object; and
identifying the class at each of the regions based on the estimated existence probability and on image information relating to the captured image.

15. A non-transitory computer-readable storage medium storing a program for causing a computer to execute an image processing method, the method comprising:
acquiring image capturing information when an object has been captured;
estimating, based on the acquired image capturing information, an existence probability of at least one of classes which indicate classification of the object at each of predetermined regions of a captured image of the object; and
identifying the class at each of the regions based on the estimated existence probability and on image information relating to the captured image.

* * * * *